United States Patent [19]
Aref et al.

[11] Patent Number: 5,768,423
[45] Date of Patent: *Jun. 16, 1998

[54] TRIE STRUCTURE BASED METHOD AND APPARATUS FOR INDEXING AND SEARCHING HANDWRITTEN DATABASES WITH DYNAMIC SEARCH SEQUENCING

[75] Inventors: Walid Aref, Plainsboro; Daniel Barbará, Princeton, both of N.J.

[73] Assignee: Panasonic Technologies Inc., Princeton, N.J.

[ * ] Notice: The term of this patent shall not extend beyond the expiration date of Pat. No. 5,528,701.

[21] Appl. No.: 545,242

[22] Filed: Oct. 19, 1995

Related U.S. Application Data

[63] Continuation-in-part of Ser. No. 300,795, Sep. 2, 1994, Pat. No. 5,528,701.

[51] Int. Cl.$^6$ .............................. G06K 9/00; G06K 9/68; G06K 9/70; G06K 9/74
[52] U.S. Cl. .......................... 382/228; 382/226; 382/187
[58] Field of Search .................................. 382/186, 187, 382/226, 178, 228, 224, 227, 229

[56] References Cited

U.S. PATENT DOCUMENTS

| | | | |
|---|---|---|---|
| 3,969,698 | 7/1976 | Bollinger | 340/146.3 |
| 5,075,896 | 12/1991 | Wilcox | 382/228 |
| 5,500,920 | 3/1996 | Kupiec | 395/2.79 |
| 5,528,701 | 6/1996 | Aref | 382/178 |

OTHER PUBLICATIONS

D. Lopresti et al., "Pictographic Naming", *Technical Report MITL-TR-21-92*, pp. 77–78 (Jun. 1994).

D. Lopresti et al., "On the Searchability of Electronic Ink", *Technical Report MIT-TR-21-92*, pp. 1–14 (Aug. 1992).

E. Fredkin et al., "Trie Memory", *Communications of the ACM*, vol. 3, No. 9, pp. 490–500 (Sep. 1960).

W.G. Aref. et al., "The Handwritten–Trie: Indexing Electronic Ink", *The Proceedings of the ACM SIGMOD International Conference on Management of Data*, May 1995.

D.E. Knuth, *The Art of Computer Programming*, "vol. 3/Sorting and Searching", Addison–Wesley, Reading, MA, 1978.

Y. Linde et al. "An Algorithm for Vector Quantifier Design", *IEEE Transactions on Communications*, vol. 28, No. 1, pp. 84–95, Jan. 1980.

W.G. Aref et al., "Indexing Multimedia Data Streams", *1994 ACM Multimedia Conference, Workshop on Multimedia Database Systems*, Oct., 1994.

L.R. Bahl, et al. "Recognition Results with Several Experimental Acoustic Processors", *IEEE*, pp. 249–251 (1979).

*Primary Examiner*—Andrew W. Johns
*Assistant Examiner*—Monica S. Davis
*Attorney, Agent, or Firm*—Ratner & Prestia

[57] ABSTRACT

A method of searching for one of a plurality of objects that matches an input sequence of handwritten objects is provided. The objects are modeled by concatenating members of a set of component objects. A Trie structure representing the plurality of objects is generated. Component objects of each object are assigned to the elements of respective nodes of the Trie structure. A respective hidden Markov model (HMM) is associated with each element of each non-leaf node. The HMMs represent the respective component object of the element. A maximum probability of any HMM accepting any of the set of component objects is estimated. The root node of the Trie structure is selected. A plurality of elements of the selected node are selected. A plurality of segments of the input sequence are applied to respective HMMs associated with the selected elements to generate respective acceptance values.

13 Claims, 11 Drawing Sheets

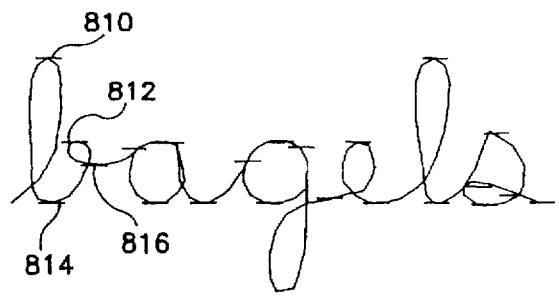
FIG. 8a
FIG. 8b
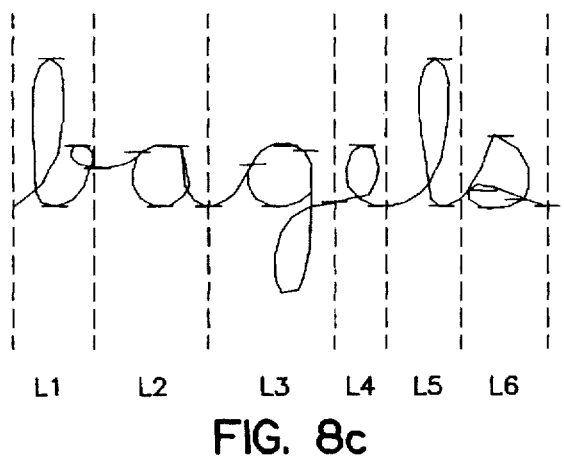
FIG. 8c
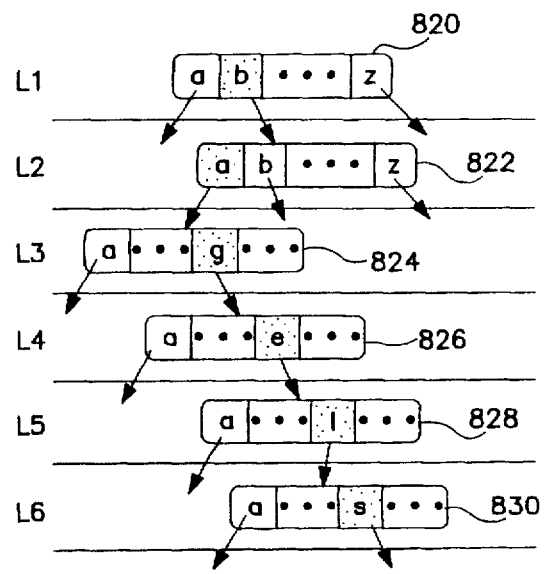
FIG. 8d

TRIE STRUCTURE BASED METHOD AND APPARATUS FOR INDEXING AND SEARCHING HANDWRITTEN DATABASES WITH DYNAMIC SEARCH SEQUENCING

Continuation-in-Part of U.S. patent application No. 08/300,795, filed Sep. 2, 1994, now U.S. Pat. No. 5,528,701.

BACKGROUND OF THE INVENTION

The present invention relates to methods of incorporating non-traditional objects in database systems and in particular to a method for employing a Trie data structure to implement a database of handwritten symbols.

The maintenance and indexing of databases having traditional objects such as letters, numbers and words is well known. U.S. Pat. No. 5,202,986 entitled PERFECT SEARCH TREE PARTIAL KEY BRANCHING, describes a specialized tree structure for database searching. The technique disclosed in this patent is based on prefixes of letters or numbers. This patent also describes a Trie structure based system which compares individual characters and an input word to match the input word to a word in the database. Even for the traditional objects described in this patent, the Trie structure based system is not preferred because it requires all possible characters for the search key to be partitioned into individual disjoint classes, where each class has a first level branch. In addition, the Trie data structure is described as containing a number of levels corresponding to the number of characters in the longest expected search key.

While it is relatively easy to index databases of traditional objects, it is more difficult to index databases of non-traditional objects such as handwritten text or symbols. These difficulties arise mainly from problems in matching similar handwritten words. It is difficult, for example, for one person to write a word the same way twice. It is even more difficult for one person to write a word in the same way that another person has written it. This inconsistency in the representation of non-traditional objects makes it difficult to match and retrieve handwritten information.

U.S. Pat. No. 5,151,950 entitled, METHOD FOR RECOGNIZING HANDWRITTEN CHARACTERS USING SHAPE AND CONTEXT ANALYSIS describes a system in which a Trie data structure is used to hold a dictionary of words that may be recognized by a handwritten character recognition system. This system includes two parts, a shape recognizer and a set of deterministic finite automata (DFA). In this application the Trie data structure is used as the DFA. At each level of the Trie data structure, the shape recognizer is passed an input string and returns a number of possible matching characters. The Trie data structure is then used to determine if any of the recognized characters is proper at this level for a sequence of characters (i.e. a word) that is stored in the database. This method, however, requires extensive operations by the shape recognizer. This component of the system must apply each letter model in the alphabet to the input string at each level of the Trie structure. The technique described in this patent only works for manuscript (hand-printed) text, i.e., non-cursive text. Manuscript text is more easily segmented than cursive text.

Ideally, the database of words which can be recognized should only hold one representation of a word and the system which uses the database should be able to recognize similar words without the need to store each different version. Hidden Markov models (HMMs) have been proposed as an alternative representation for handwritten words. In the HMM approach, each handwritten word in a database is represented by a statistical model, the HMM. Each HMM is trained so that it accepts the specific word with a high probability relative to other words in the database. In systems which use HMMs to recognize handwritten words, a separate HMM is stored for each word in the database. In order to recognize a given input word, each HMM in the database is executed and the one which accepts the input word with the highest probability is selected as the matching HMM. Because each HMM in the underlying handwritten database has to be tested against the input word, this system operates in a linear process where the speed of execution is a formidable obstacle.

SUMMARY OF THE INVENTION

The present invention is a method of searching for one of a plurality of objects that matches an input sequence of handwritten objects, and an apparatus for performing the method. The objects are modeled by concatenating members of a set of component objects.

A Trie structure representing the plurality of objects is generated. The Trie structure has a plurality of non-leaf nodes. Each non-leaf node includes at least one element. Each element has a child node associated with the element. Component objects of each of the plurality of objects are assigned to the respective elements of respective nodes of the Trie structure. A respective hidden Markov model (HMM) is associated with each element of each non-leaf node. The HMMs represent the respective component object of the element;

A maximum probability of any of the HMMs accepting any of the set of component objects is estimated.

The root node of the Trie structure is selected. A plurality of elements of the selected node are selected.

A plurality of segments of the input sequence are applied to respective HMMs associated with the selected elements to generate respective acceptance values.

For each one of the selected elements, the method calculates a respective estimated probability that the input sequence matches any of the plurality of objects, represented by respective paths in the Trie structure that pass through the child node associated with the one selected element, as a function of the estimated maximum probability and the respective acceptance value of the one element.

The search for an object that matches the input sequence proceeds next within a subtree which has as a root the child node associated with the one of the selected elements for which the respective estimated probability is greatest.

According to another aspect of the invention, the step of searching within the subtree includes the following steps: A child node is determined, which child node is associated with the one element for which the respective estimated probability is greatest. Each element of the determined child node is selected. A set of entries is added to the data structure. Each added entry is associated with a respectively different element of the child node. The respective HMM associated with each element of the child node is executed. A respective acceptance value is generated for each element of the child node. The entry which is associated with the element with which the child node is associated is deleted from the data structure. The steps of selecting elements, applying the input segments to the HMMs, estimating probabilities and searching within a further subtree are then executed recursively.

According to a further aspect of the invention, additional entries may be created in the data structure, corresponding to various types of framing errors which may be present in the query. This technique allows the best match to be found by the search, even in the presence of framing errors.

These and other aspects of the invention are described below with reference to the exemplary embodiments.

BRIEF DESCRIPTION OF THE FIGURES

FIGS. 8a and 8b and 8c are drawings of handwritten words which illustrate the application of the segmentation method.

FIG. 8d is a data structure diagram of a Trie data structure that is useful for describing the operation of the exemplary method using the segmenting method.

OVERVEIW

The present invention relates to a method for indexing a plurality of handwritten objects in a Trie data structure using hidden Markov models (HMMs), and for searching the Trie structure to find the object that best matches an input sequence. More particularly, the invention relates to a searching method in which the search order through the Trie is dynamically adjusted. At each stage of the search, the method quickly estimates which previously unevaluated node of the Trie has the best probability of being included in the path through the Trie representing an object that best matches the input sequence. This quick estimate is performed without necessarily executing all of the HMMs in any branch of the Trie all the way to a leaf node(i.e., without a depth-first search), and without executing all of the HMMs at the level of the node currently being evaluated (i.e., without a breadth-first search).

In appropriate circumstances, this method causes the search to "backtrack" before proceeding all the way to a leaf node, in order to evaluate a more promising path previously not evaluated. This may occur, for example, if the prefix of the input sequence is distorted or incorrectly entered; the "wrong" HMM provides a high acceptance probability for the prefix of the input sequence, causing the search to proceed down a branch of the tree in which all of the HMMs yield low acceptance probabilities for the suffix of the input sequence. At the first stage in which updated evaluation of the current search path suggests that the current path has proved to be less promising than a second path previously not taken, the search is shifted to the second path.

Figure 2:
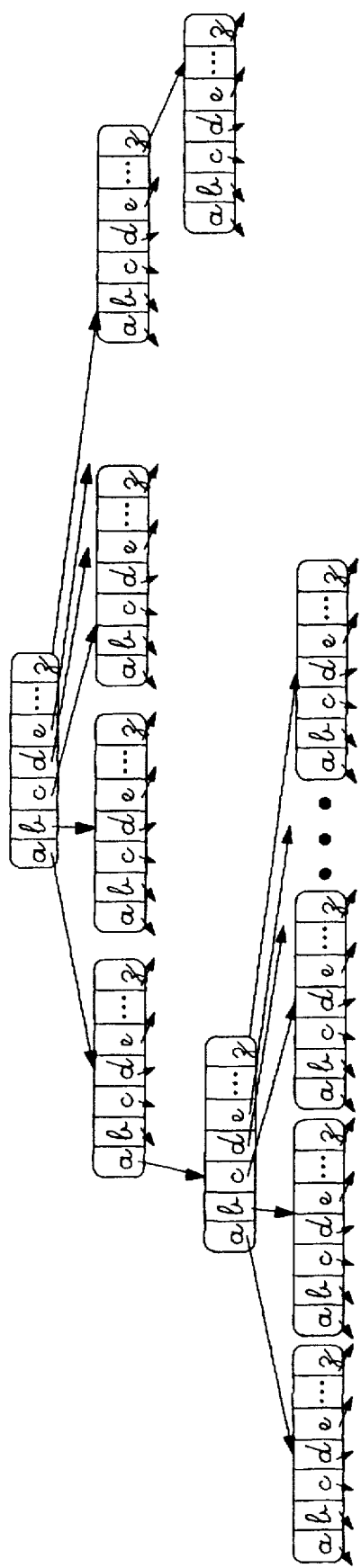
FIG. 2 is a data structure diagram which illustrates an exemplary handwritten Trie data structure.

The Trie data structure is a well known structure which has been used for indexing data stored in a database. The Trie structure may be considered to be an m-way tree consisting of a plurality of nodes, each node having m entries and a pointer to another node. In most database implementations, each entry in the Trie structure corresponds to a digit or a character of an alphabet. FIG. 2 shows an example of a Trie data structure for holding handwritten text while FIG. 3 shows an example of a Trie structure in which the alphabet is the digits 0 to 9.

Figure 3:
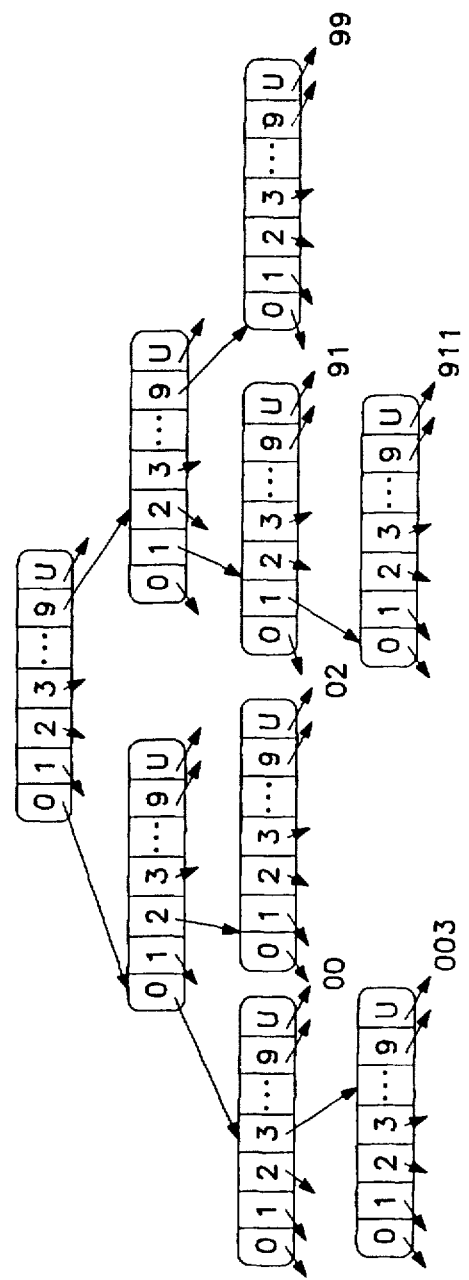
FIG. 3 is a data structure diagram which illustrates principles of operation of systems using Trie data structures.

In the Trie data structure shown in FIG. 3 each node on a level l of the Trie structure represents a set of all of the keys which begin with a certain character sequence of l characters. The node also specifies an m-way branch, depending on the l+1th character. It is noted that in each node of the Trie data structure shown in FIG. 3 an additional null entry has been added to allow for storing 2 numbers, a and b where a is a prefix of b. Thus in a Trie data structure, each node may be both a branch node and leaf node.

Each object at each level is associated with a hidden Markov model for the object. This HMM is constructed so that it accepts this specific object with the high probability, relative to the other objects of the alphabet.

Searching the Trie data structure shown in FIG. 3 using a pure depth-first search strategy is a relatively simple operation. The first digit in the number is compared to each element of the first node until a match is found. The identified element then points to a second node in the Trie structure which is used to locate the second digit in the input number. When the matching digit in the second node is found for the second digit in the input number, a node to be used to identify the third digit of the number is identified. This operation continues until all of the digits in the input number have been consumed. At this point, the null entry in the last node that was located holds the identified number. In a data based system this node may also hold a pointer to other fields in a database record that are associated with the identified key.

Such a depth first strategy is prefix sensitive; if a mismatch occurs (i.e., the wrong HMM accepts a symbol with a higher probability than the correct HMM) early in the input sequence, the mismatch is typically not corrected until the search has progressed all the way to the leaf node of the branch containing the mismatched node.

The present invention overcomes the prefix sensitivity of a pure depth-first search and reduces the level of computation needed to recognize a word by combining the hidden Markov model with a Trie data structure which represents all possible words in the database. To search for a handwritten word using the Trie structure, the method starts at the root and descends the tree so that the path that is followed depends on the best match between the input sequence and an object, dynamically adjusted at each level.

Figure 10:
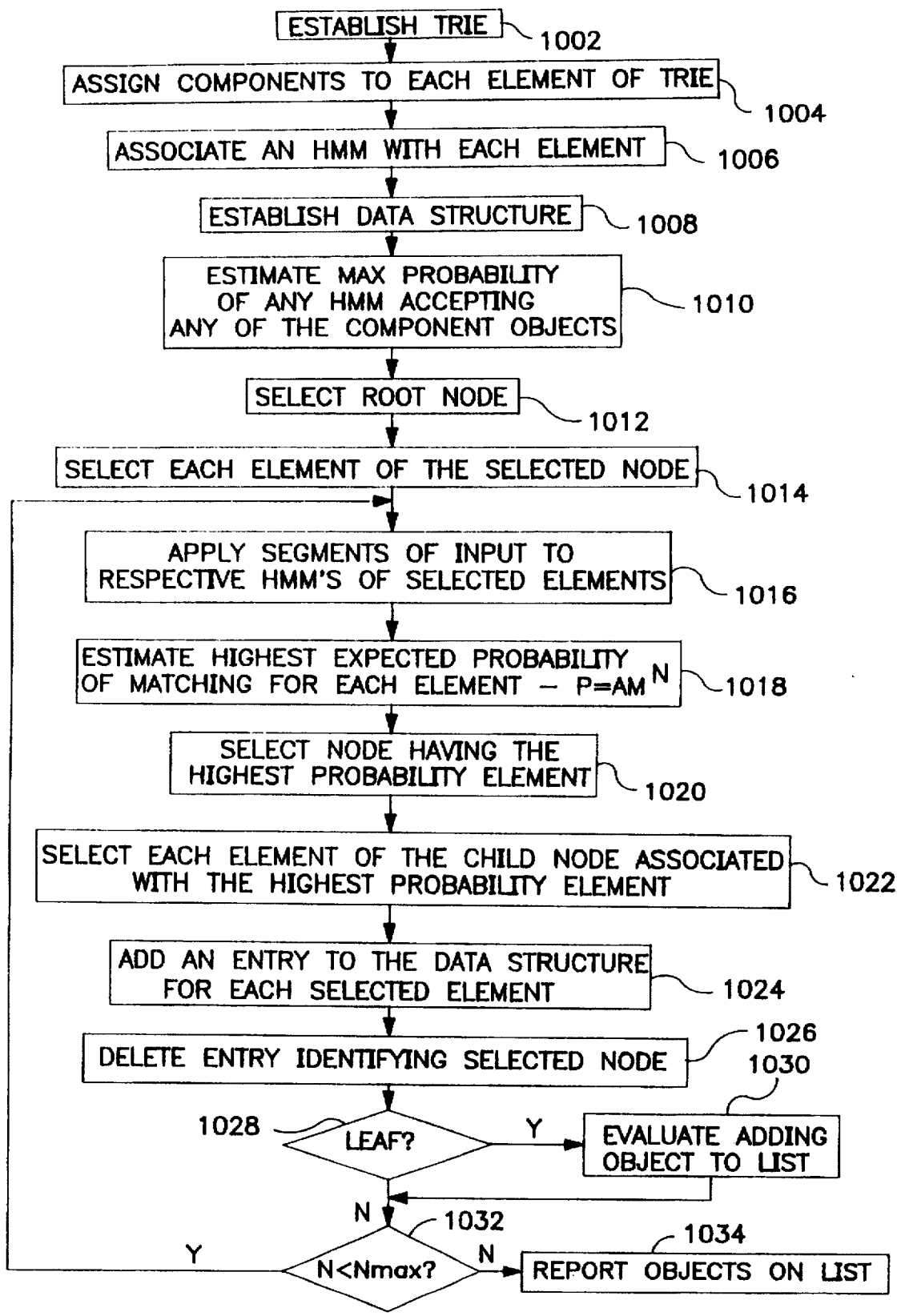
FIG. 10 is a flow chart diagram which illustrates an exemplary method for searching the Trie data structure of FIG. 2.

FIG. 10 is a flow chart diagram of an exemplary method of searching for one of a plurality of objects that matches an input sequence of handwritten objects. The objects are modeled by concatenating members of a set of component objects, which may be strokes or feature vectors.

At step 1002, the Trie structure representing the plurality of objects (which may be cursive text) is established. The Trie data structures shown in FIGS. 2 and 3 represent such a Trie data structure. The Trie structure has a plurality of nodes. Each node includes at least one element. Each element is associated with a respective child node.

At step 1004, component objects (i.e., components) of each of the plurality of objects are assigned to respective elements of respective nodes of the Trie structure. One of ordinary skill in the art would understand that in FIGS. 2 and 3, the Trie, the component objects are characters and numbers, respectively; but in the exemplary Trie data structure the component objects are feature vectors which represent individual strokes made by movement of a stylus across a digitizing pad, as explained in the detailed description, below.

At step 1006, a respective hidden Markov model (HMM) is associated with each element of each node of the Trie. The HMM represents the respective component object of the element.

At step 1008, a data structure which includes a plurality of entries is established. This data structure contains an ordered list of nodes, such that the plurality of HMMs associated with each respective element in the node have not yet been executed against the input sequence during the current search operation. The order of the entries specifies which node is next evaluated next. The order of the entries is dynamically adjusted, as explained below, so that neither a pure depth-first or breadth-first search strategy is used.

A node is "evaluated" by applying a portion of the input sequence to all of the HMMs associated with the respective elements in the node, and estimating the highest probability of any path through the Trie passing through that node.

At step 1010, a maximum probability of any of the HMMs accepting any of the set of component objects is estimated. This may be accomplished in a number of ways. For example, by accumulating the highest HMM probability value generated at any time during the life of the database, by gathering data during the process of training the HMMs, or by other empirical methods.

At step 1012, the root node of the Trie is selected for "evaluation, and at step 1014, each element of the selected node is "selected" by storing entries in the data structure which are associated with each respective element. Thus, initially, each entry identifies a respectively different child of the root node of the Trie structure. The "selected" elements associated with the entries of the data structure (and the child nodes to which they point) form a pool of candidates from which the next node to be evaluated is chosen.

At steps 1016 and 1018, the selected node is evaluated. At step 1016 respective segments of the input sequence are applied to the respective HMMs associated with each selected element to generate respective acceptance values.

At step 1018, a respective probability value is estimated for each selected element. The value for each element is an estimate of the probability that the input sequence matches any of the plurality of objects represented by respective paths in the Trie structure that pass through the respective child associated with that element. Each estimated probability value is calculated as a function of the estimated maximum probability (from step 1010) and the respective acceptance values of the selected elements provided by the HMM in step 1016. For each given path, the estimated probability is calculated as the product of two values. The first value is the product of each calculated acceptance value from the HMMs in the portion of the path between the root of the Trie and the node being evaluated. The second value is a conservative estimate of the product of all the acceptance values for HMMs in the path between the node and a respective leaf node; the estimate is based on the assumption that each HMM between the current node and the leaf returns the maximum probability value from step 1010.

Thus, the Trie structure has N levels, ordinally numbered 0 through N-1. For each selected element the estimated probability associated with the selected element is calculated, according to the equation:

$$P = \left( \prod_{i=0}^{L} A_i \right) * M^{N-1-L}$$

wherein P is the estimated probability, i is an index, L is the level of the node having the selected element, $A_i$ is the acceptance value associated with the element in level i within the respective path through the node having the selected element, and M is the estimated maximum probability of any of the HMMs accepting any of the set of component objects.

At step 1020, the node having the element for which the respective value of the estimated probability is greatest is selected to be evaluated next. This node may be a child node of the last node evaluated, or it may be a node from a completely separate subtree (so that the last node evaluated and the next node evaluated belong to two disjoint paths through the Trie data structure).

At step 1022, the elements of the node associated with the highest estimated probability element are all selected for evaluation of the nodes to which these elements point.

At step 1024, a set of entries is added to the data structure. Each added entry in the set identifies a respectively different child of the node selected at step 1020. Each entry in the data structure represents a candidate node that may be evaluated next. If the data structure is full, then we the entries are deleted which are associated with elements that point to nodes through which pass the paths having the lowest estimated probability of matching the input string.

At step 1026, the entry which identifies the selected node is deleted. (It is no longer needed, because the data structure is used to identify candidates for evaluation, and the entry defining the selected node has already been evaluated). It is important to note that the entries pointing to nodes that were not evaluated in step 1020 are not deleted at this time, unless it is necessary to delete them to make room for higher probability entries added in step 1024.

At step 1028, if a leaf node has been reached on any of the branches of the Trie, then at step 1030, a determination is made whether to add the object pointed to in the leaf node to a list of best matches. This process is set forth in detail in the detailed description.

At step 1032, a check is made to determine whether the budgeted time has been used up. Regardless of whether the object is added to the list of best matches in step 1030, if there is still budgeted time available, then execution of steps 1016–1028 is continued, to evaluate other candidate paths through the Trie structure.

The search strategy according to the invention advantageously removes the prefix sensitivity of the depth-first search method, because it is capable of backtracking before following a branch of the Trie all the way to a leaf node.

According to a further aspect of the invention, the searching method for the Trie may also provide for matching in the presence of insertion, deletion and substitution errors. This is generally accomplished by creating multiple entries in the data structure for each element of the node being evaluated. One entry assumes no errors; a second entry assumes that an insertion error has occurred; a third entry assumes that a deletion error has occurred; two further entries assume that a substitution error has occurred. Each of these entries is independently handled within the data structure, as an independent candidate for identifying the next node to be evaluated.

These and many other aspects of the invention are described below with reference to the detailed description of the exemplary embodiments.

DETAILED DESCRIPTION

HMM TRIE DATA STRUCTURE

While the exemplary embodiment of the invention is described in the context of a system for recognizing continuous handwritten text, it is contemplated that it may be applied to other systems in which continuous data is to be segmented into components and the components associated with objects. For example, the system may be applied to a speech recognition system in which individual words are stored into a Trie data structure and the component objects are phonemes. Alternatively, it may be applied to a speech recognition system at a higher level in which continuous speech phrases are stored into the Trie data structure and the component objects are individual words. These two implementations may be combined to produce a two-level system in which one Trie data structure holds the individual words in the form of their component phonemes and a higher level data structure holds the individual phrases in the form of their component words. It is also contemplated that a system according to the present invention may be applied to recognize other types of input data which is not easily segmented, such as hand-drawn pictures.

Although the Trie data structure is generally modeled as an M-ary tree, it is contemplated that the memory space used by the Trie structure may be reduced by using a linked list for each node. The use of a linked list in conjunction with the Trie structure reduces the memory space because most of the elements in the nodes of the Trie data structure tend to be empty.

By this alternative implementation, the Trie data structure would be replaced by a forest of trees. Searching in such a forest would proceed by finding the tree having a root node which matches the first letter in the input word, and then finding the descendant nodes from that root that match the successive letters of the word.

Another alternative implementation of the Trie data structure would be as a hybrid between the Trie data structure and some other structure. For example, the Trie data structure may be used to identify the first few characters of a word and some other data structure, for example a simple list may be used in a part of the tree where only a few objects may be encountered.

In the database applications described above, the Trie data structure has been used with an alphabet of well defined symbols, for example, the numbers 0 through 9 as shown in FIG. 3. One difficulty in using a Trie data structure with a handwritten database is the difficulty in differentiating between characters in the handwritten alphabet. As described above, several authors have used HMMs to model handwriting and handwritten documents. The detailed description section of this application describes how HMMs may be combined with a Trie data structure to implement an effective indexing system for a handwritten database.

Figure 1:
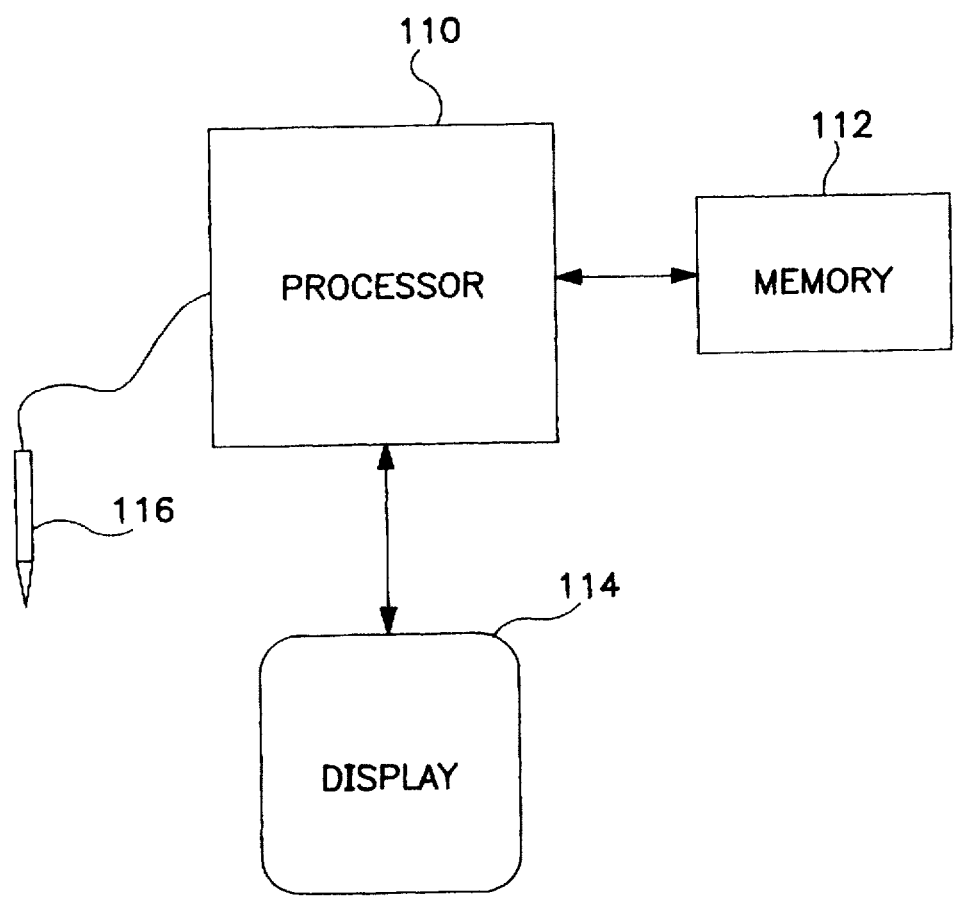
FIG. 1 is a block diagram of a pen based computer which may be used to implement the method of the present invention.

FIG. 1 is a block diagram of computer apparatus suitable for use with an exemplary embodiment of the invention. The exemplary apparatus includes a processor 110 and memory 112 forming a conventional computer such as a pen based personal digital assistant (PDA). Information produced by the computer is displayed on a display device 114. Data may be input to the computer via a pen like transducer 116. As characters are drawn, for example, on the display device 114, the transducer 116 provides 4 types of data values: direction of movement, velocity of movement, change in direction and change of velocity. As the information provided by the transducer 116 is digitized, each feature is quantized into a set of 4 possible values. Thus, any movement of the pen may be represented by an 8-bit value. In the exemplary embodiment of the invention, the quantized pen movements are used to form feature vectors or labels for hidden Markov models that are used to identify symbols (i.e. letters) from an alphabet of objects, $\Sigma$.

In the exemplary embodiment of the invention, we use a left to right HMM structure, where no state transitions are allowed which jump more than one state ahead. In this exemplary embodiment of the invention, each input state is represented by a cluster of feature vectors. A state change occurs only when there is a material change in the input feature vectors provided by the transducer 116.

Figure 4:
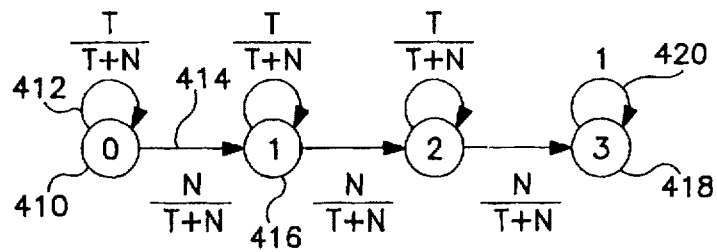
FIG. 4 is a state diagram representing a forward hidden Markov model.

An example of an HMM of the type used in the exemplary embodiment of the invention is shown in FIG. 4. This model includes 4 states numbered 0 to 3. The probability to jump from state I to state I+1, where I is less than 3, is $N/(N+T)$, while the probability of staying in state I is $T/(N+T)$. There is no transition from state 3 and the probability of remaining in state 3 is 1.

The HMM shown in FIG. 4 may be trained to accept a particular handwritten letter by assigning subsequences of a string of input symbols representing many examples of the letter to each of the 4 states. Each additional input sequence adds to a frequency distribution of the different input vectors which occur in each of the states. At the end of the training, this frequency distribution is normalized to obtain a probability distribution. In this exemplary embodiment of the invention, the transition probabilities are adjusted so that the HMM is encouraged to remain in a state until it consumes the symbols in the input pattern that have a high probability of correspondence to the symbols that were assigned to the state. The training process is completed by assigning a small probability value, $\epsilon$, to any objects which did not appear in the training patterns.

Figure 5:
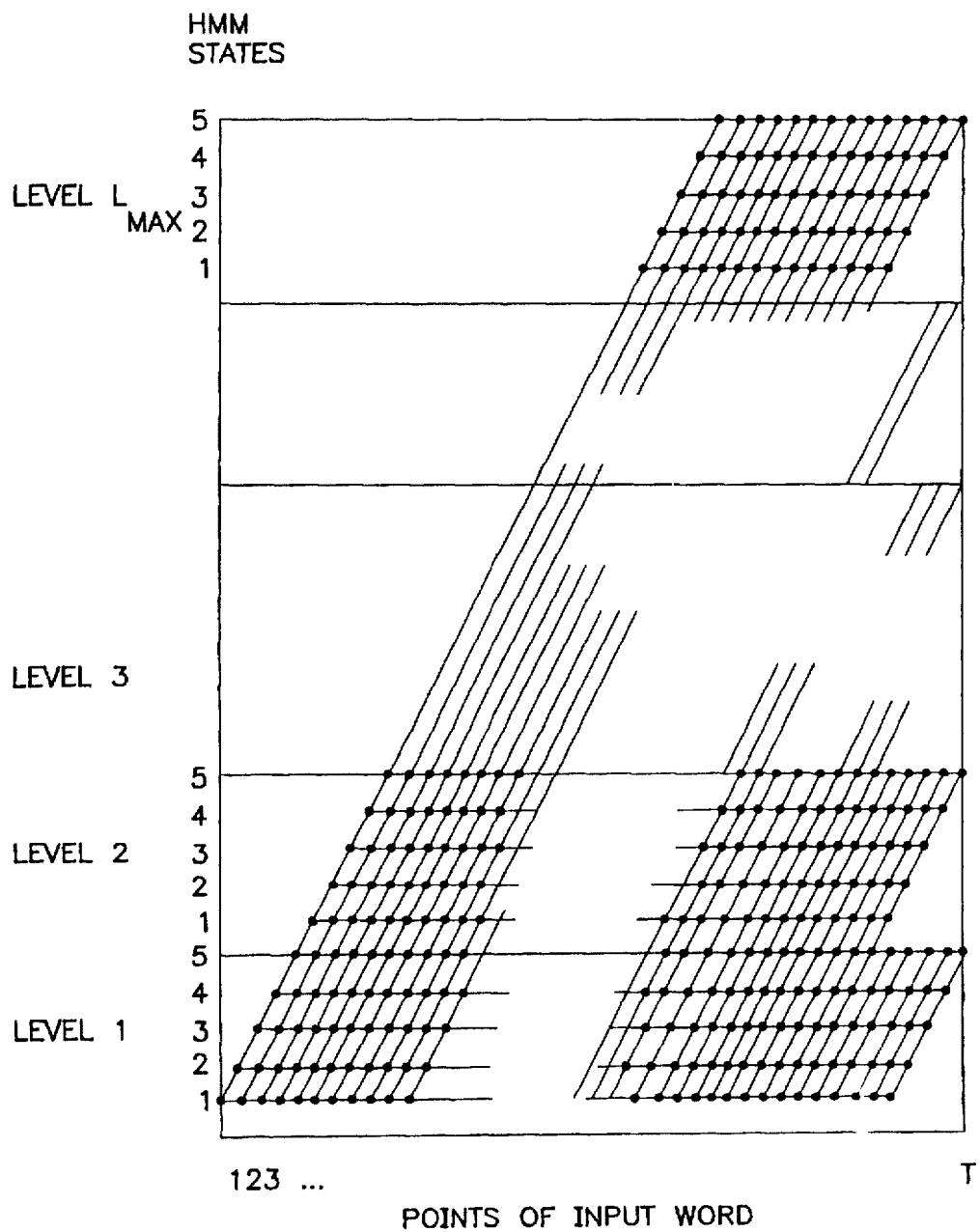
FIG. 5 (prior art) is a graph of input data versus hidden Markov model states which is useful for describing a method for recognizing handwritten text from the prior art.

Once an HMM has been constructed for each object of the alphabet $\Sigma$, the HMMs may be applied to recognize an input word. One method by which this may be done is to determine a maximum possible number of objects that can exist in the input word and then apply the HMMs for the objects in the alphabet to all possible levels. Since no object segmentation occurs in the input word, this method needs to check all possible starting and ending points of each object. This method is shown in FIG. 5. In this Figure, all the HMMs of the objects in $\Sigma$ are executed at level 1. At level 1, the starting point of each object is the first sample point of the input word w, while the location of the ending point varies from the $N^{th}$ sample point to the $T^{th}$ sample point of w.

At the first level, the HMM of a given letter is executed for every possible ending position and the final probability value for that letter is computed. In FIG. 5, a horizontal line indicates that the HMM remains in the same state while consuming one point of the input word, while a line which goes up indicates a transition to the next state which consumes 1 point of the input word. Thus, each line of the graph shown in FIG. 5 is a separate probability computation which must be performed in order to recognize the T sample points of the input word. It is noted that, using the method shown in FIG. 5, considerable computation is needed to determine the respective probabilities that the first few input symbols represent each object in the alphabet Σ. These calculations must be repeated for each letter of the longest word that could be recognized.

The Trie data structure is advantageous for two reasons. First, it prunes the search space since the search is limited to only those branches that exist in the Trie structure, that is to say to those words that exist in the database represented by the Trie structure. Second, using the Trie structure also helps add some semantic knowledge of the possible words to look for, as opposed to considering all possible letter combinations as was done in the conventional recognition method.

The implementation of a Trie data structure in an HMM based handwriting recognition system, however, is not a straight forward combination. Because the input handwritten word is cursive, characters in word are not segmented. For ease of recognition, these characters should be segmented so that each character can be used to match a corresponding character in one of the Trie structure nodes. In addition, extra strokes which are not defined in the models for the letters may be used to connect the letters in cursive writing. These strokes are desirably handled by any recognition method in such a way that they do not interfere with the matching process.

Figure 6:
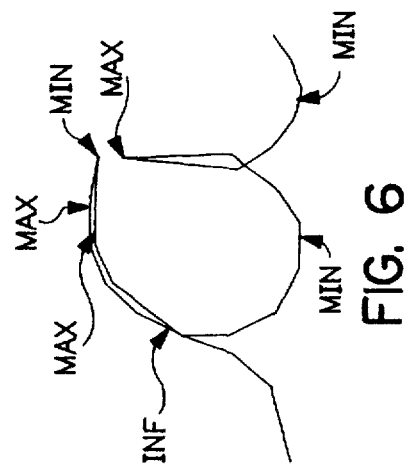
FIG. 6 is a drawing of a handwritten letter "a" which is useful for illustrating a segmentation method according to the present invention.
Figure 7:
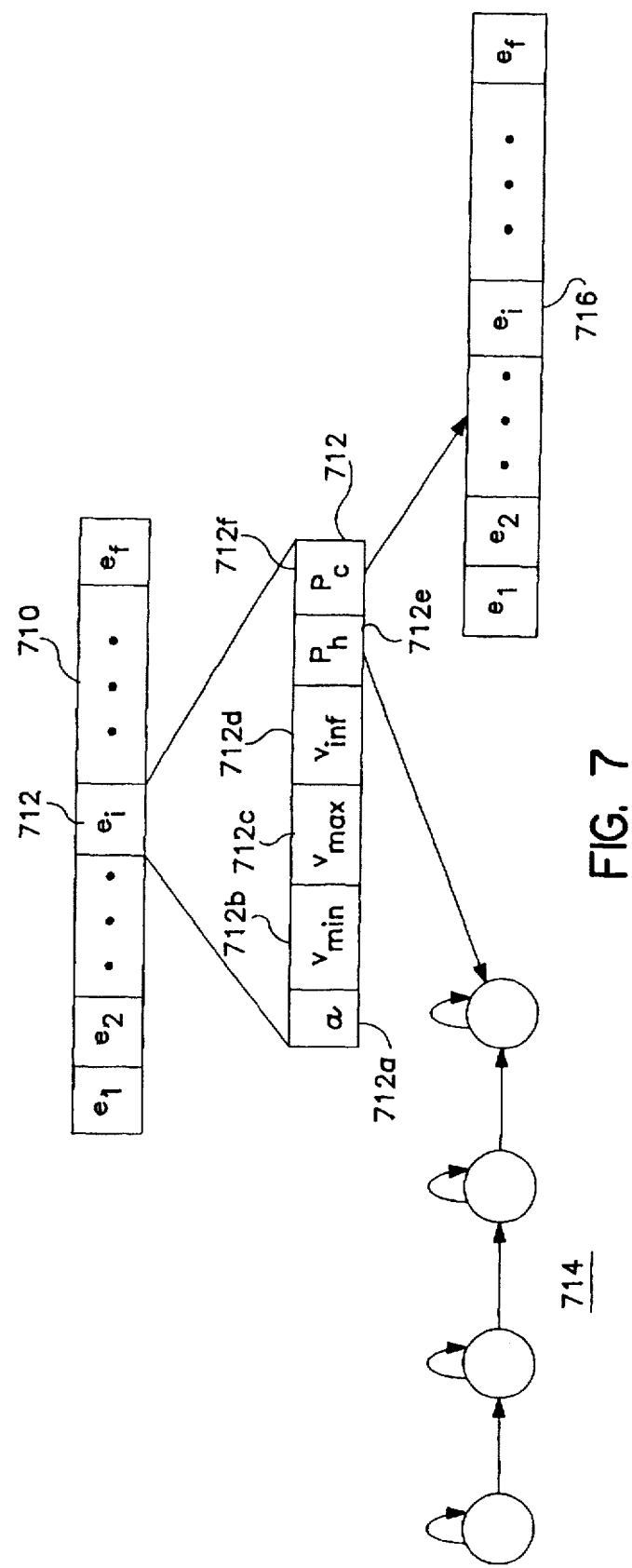
FIG. 7 is a data structure diagram which illustrates a Trie data structure suitable for use with the present invention and the segmenting method.

One method of character segmentation is to use counts of minima, maxima and inflection points. This is illustrated in FIG. 6 for the letter 'a'. As shown in FIG. 6, one inflection point, three local maxima and three local minima are identified for the cursive letter "a." In a first exemplary embodiment of the invention, the number of local maxima, local minima and inflection points for each letter are stored in the respective elements of each node of the Trie structure. This is illustrated in FIG. 7. In this Figure, a node of the Trie structure 710 includes multiple elements E1, E2 ... Ef. One of the elements, 712, is expanded to show the various fields that it contains. The first field 712a indicates the letter that is represented by the Trie structure element. The next three fields, $v_{min}$ 712b, $v_{max}$ 712c and $v_{inf}$ 712d, give the respective numbers of minima, maxima and inflection points that are encountered when the letter "a" is processed. The field $P_h$ 712e of the element shown in FIG. 7 points to the HMM that corresponds to the letter "a" while the field $P_c$ 712f, points to the node in the Trie structure that will be used to recognize the strokes in the input sequence that follow the strokes corresponding to the letter "a."

FIGS. 8a, 8b, 8c and 8d show the process that is used to recognize the cursive word "bagels" using the exemplary method. FIG. 8a shows the word "bagels" as it is written in cursive characters. In FIG. 8b, the word has been marked to indicate the minima, maxima and inflection points. For example, the maxima, 810 and 812 and minima 814 and 816 are recognized in the strokes that correspond to the letter "b." Although these points in the input sequence are marked by horizontal or vertical lines in FIG. 8b, it is understood that the minima, maxima and inflection points would be indicated in a manner that could be used by the system. For example, the system may maintain a list of the positions of the minima, maxima and inflection points with each member in the list corresponding to a respective stroke of the input sequence.

The next steps in the recognition process are shown in FIG. 8c and 8d. In these steps, each letter in the alphabet is compared to the starting sequence of strokes but, rather than try every possible ending point for the sequence to correspond to the letter, the analysis of each letter terminates when the respective numbers of minima, maxima and inflection points for that letter have been encountered in the input sequence. As each letter is recognized, the strokes in the input sequence that correspond to that letter, as delimited by the minima, maxima and inflection points, are deleted from the input sequence, and a new level in the Trie structure is executed to identify the next letter in the word.

Using this method, the letter "b" is recognized at level L1 using the HMM's of the elements contained in node 820. Once the letter "b" has been recognized, the input sequence is trimmed to remove the strokes containing the number of maxima, minima and inflection points that were identified for the letter "b." The trimmed input sequence is applied to node 822 at level L2. In this example, the HMM in the element of this node which corresponds to the letter "a" has the highest probability in view of the new initial strokes in the input sequence. Accordingly, the letter "a" is recognized at level L2 of the Trie structure. The input sequence is again trimmed to delete the strokes corresponding to the letter "a" and the HMM's of node 824 are applied to the new starting strokes of the input sequence to recognize the letter "g." This method continues in this manner until the remaining letters in the word "bagels" have been recognized at nodes 826, 828 and 830.

In the exemplary embodiment of the invention, the final maximum or minimum of a letter is not pruned from an input sequence since this point in the input sequence may correspond to the first maximum or minimum of the next letter in the word. It is also noted that the computational burden is greatly reduced by the Trie data structure. If, for example, the only word in the database which includes the starting letters "bage" is "bagels," then, to confirm that the written word corresponds to "bagels," the system only needs to determine, at levels L5 and L6 of the Trie structure, that it is more likely than not that the final strokes correspond to the letters "l" and "s." There is no need to perform the computations involved in comparing these strokes to the other letters in the alphabet Σ.

Figure 9:
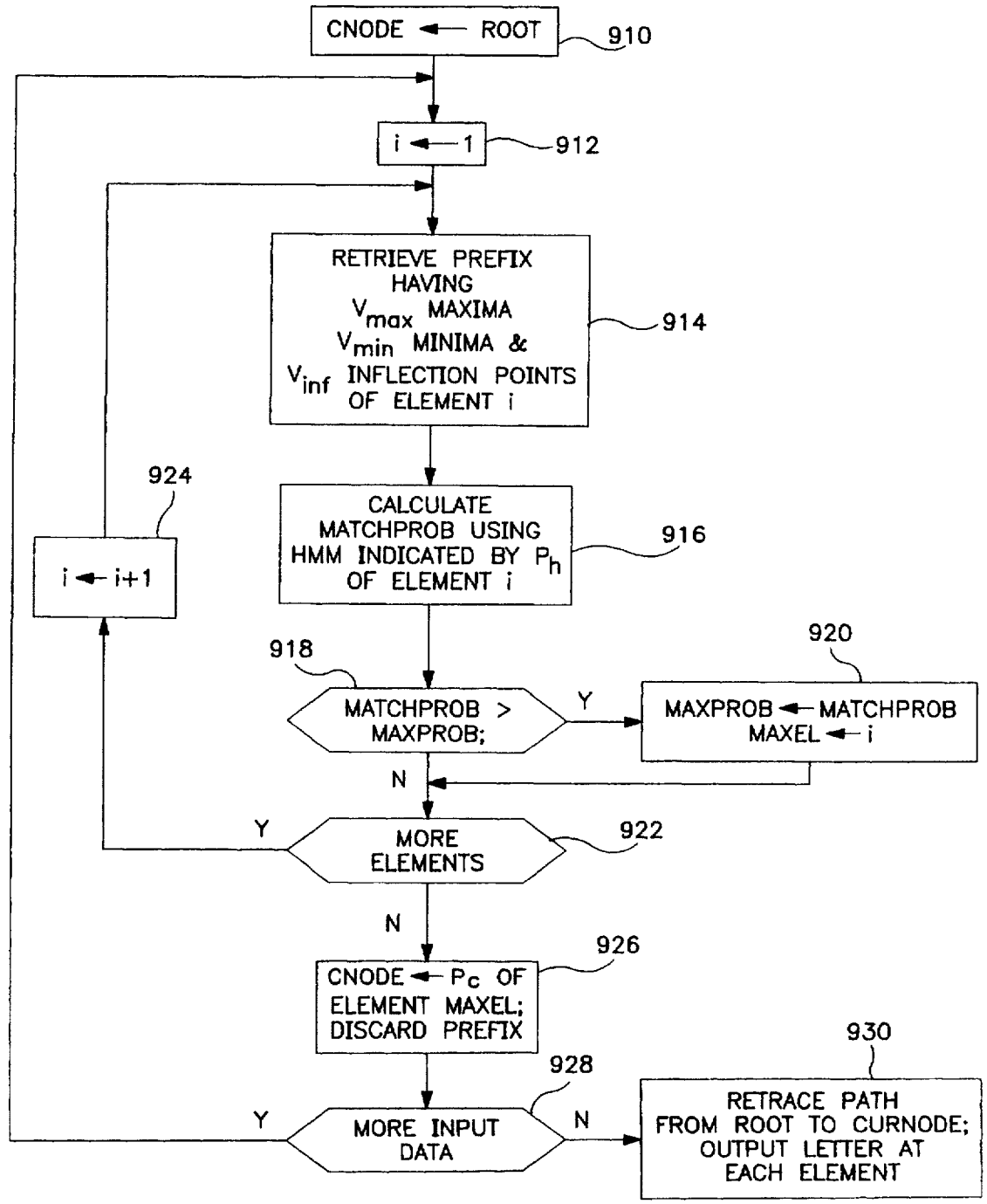
FIG. 9 is a flow chart diagram which illustrates the operation of the first exemplary method according to the present invention.

The method according to this first embodiment of the invention is shown in the flow-chart diagram of FIG. 9. The first step in this method, step 910, assigns the root node of the Trie structure as the current node, CNODE, that is being used to analyze the input sequence. The next step 912 assigns a value of 1 to a variable i which is used to index through the elements of node CNODE. At step 914, the system retrieves the strokes in the input sequence having $v_{max}$ maxima, $v_{min}$ minima, and $v_{inf}$ inflection points, as defined by element i. Next, at step 916, the system calculates a probability value MATCHPROB, that the input sequence matches the letter represented by element i. At step 918, MATCHPROB is compared to a running maximum value MAXPROB. If MATCHPROB is greater than MAXPROB, then, at step 920, MATCHPROB is assigned as the new value for MAXPROB and the element index i is assigned to a variable MAXEL, the element index which corresponds to the maximum probability. If MATCHPROB is not greater than MAXPROB at step 918 or after step 920, step 922 is executed to determine if there are more elements at node CNODE. If so, the index i is incremented at step 924 and control is transferred to step 914.

If at step 922 it is determined that the last element in CNODE has been processed then, at step 926, the field $P_C$ of element MAXEL is assigned to CNODE and the prefix having the number of maxima, minima and inflection points indicated by the fields $v_{max}$, $v_{min}$ and $v_{inf}$ of node MAXEL is trimmed from the input sequence. At the next step, 928, the process determines if there are any strokes remaining in the input sequence. If there are, control is transferred to step 912 to process the new CNODE. Otherwise, control transfers to step 930 to retrace the path from the root node to CNODE and to output the letter at each branching element of each node in the path.

SEARCHING BY THE BUDGET-BASED SEARCH PROCEDURE

Assume that an input handwritten word W is segmented into a sequence of alphabet symbols $a_1, a_2, \ldots, a_n$ (e.g., see FIG. 1 where the word "bagels" is segmented into 6 alphabet symbols, i.e., n=6). Assume further that an HMM is provided for each symbol in the alphabet set A. Let the number of symbols in A be $N_A$. Therefore, there are $N_A$ HMMs $H_1$, $H_2, \ldots, H_{N_A}$. A running-time budget is established, which is expressed in terms of the maximum number of HMMs that the system can execute during the search.

Instead of executing all the HMMs $H_1, H_2, \ldots, H_{N_A}$ for each letter of the input word, only the HMMs that correspond to symbols that exist in the Trie are executed. The method maintains the following data structures: the array HMM_tried[i, 1 . . . $N_A$], the integer variable HMM_Budget, a stack, and the list best matches.

For each letter $a_i$ in the input word, HMM_tried[i, 1 . . . $N_A$] indicates which HMMs have been "tried," i.e., executed (a value of zero means not executed; and a non-zero value means executed) with $a_i$ as input, and if executed, a non-zero value is stored which indicates the probability of accepting $a_i$ by the corresponding HMM. For example, HMM_tried[1, "c"]=0.3 means that the HMM corresponding to the letter "c" accepts the first letter of the input word (i.e., $a_1$) with probability 0.3, and HMM_tried[1, "d"]=0 means that the HMM corresponding to the letter "d" was not executed with $a_1$, as the input.

Each time the entire input word is matched by a word in the Trie, the matched word, as well as its matching probability, are stored in the sorted list best_matches. The size or number of words that can be kept in best_matches at a given time may be limited by a constant, k. By the end of the searching process, the k words in best_matches may be reported as the best k matches that have been found so far.

Figure 12:
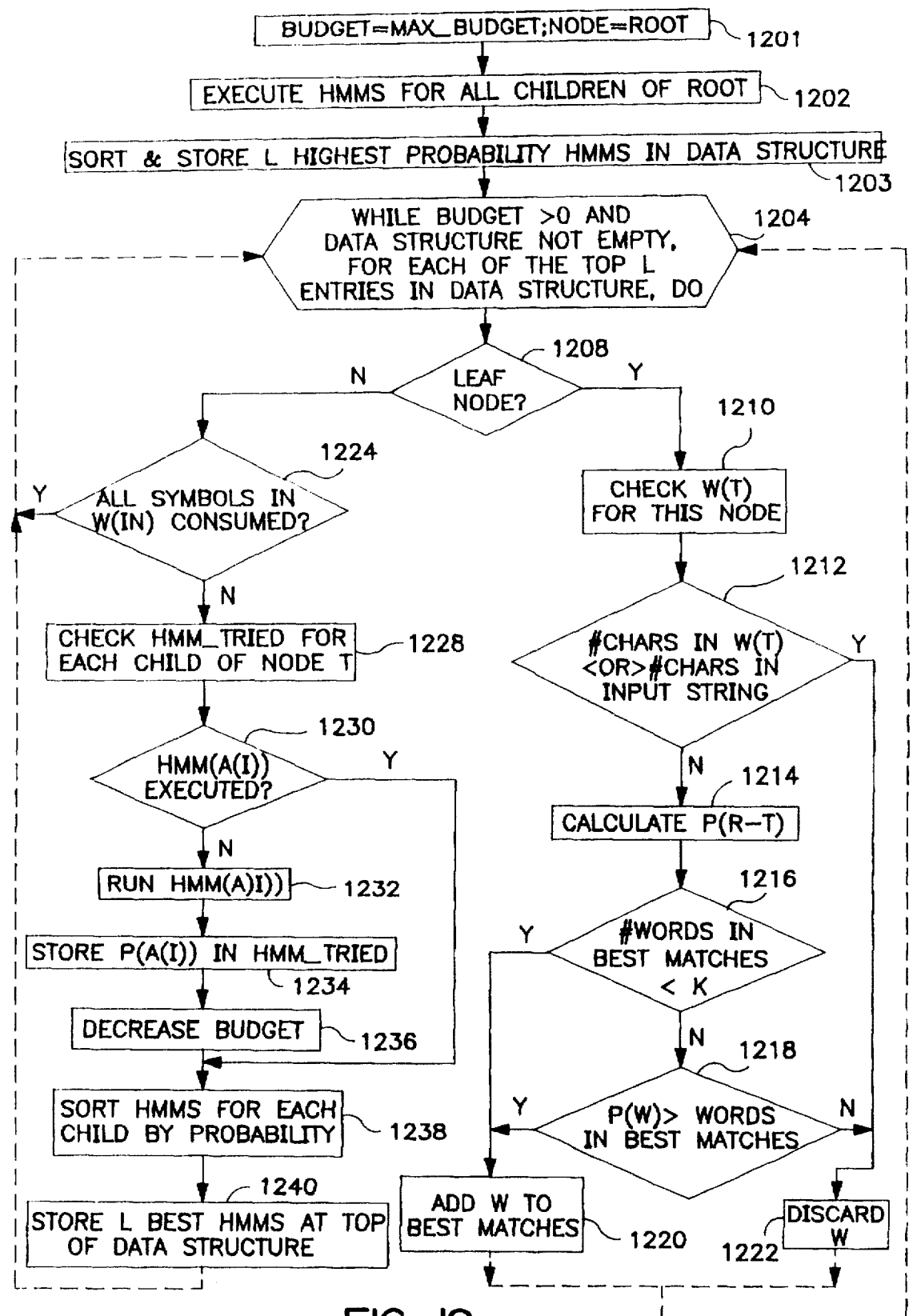
FIG. 12 is a flow chart diagram of the depth-first search method for matching an object in the HMM Trie structure.

FIG. 12 is a flow chart diagram showing the budget-based search method. The variable HMM_budget is the maximum amount of time that may be used for a query, and is measured in terms of the number of HMMs that are executed. Each time a node of the Trie is evaluated and some HMMs are executed, HMM_budget is decreased by the number of HMMs that are executed. The searching process is discontinued once HMM_budget reaches zero. In this case, the words that are stored in best_matches are reported as the final result of the search.

At step 1201, the integer variable HMM_budget is initially set to the maximum number of HMM executions that are permitted during the search, and the root node is selected.

At step 1202, the search is started at the root "r" of the Trie, where all the HMMs that corresponds to the symbols in "r" are executed with the letter $a_1$ as input. The resulting probabilities of accepting $a_1$ are stored in array HMM_tried [1, 1 . . . $N_A$], and are sorted. The loop from steps 1204 to 1240 is repeated so long at the variable budget is greater than zero and there are entries in the stack within the data structure.

At step 1208, if the current node being evaluated is not a leaf node, step 1224 is executed. At step 1224, if all of the symbols in the input string have already been consumed (i.e., the candidate words in the leaf nodes of the subtree having the current node as a root are longer than the input string), then node t is skipped, and control returns to node 1204.

If there are further input symbols to process, then, at steps 1228–1230, the array HMM_tried is checked. If a given HMM has already been executed for this symbol, the result is retrieved from HMM_tried instead of repeating the execution.

If the HMMs have not been executed, than at step 1232, each HMM pointed to by the current node is executed against the symbol, and at step 1234, the acceptance value is stored in the HMM_tried array. At step 1236, the budget is decreased each time an HMM is executed.

At step 1238, all of the HMM acceptance values (probabilities of the current symbol being generated by the HMMs associated with the current node) are sorted in decreasing order by probability.

At step 1240, the best L HMMs (i.e., the ones that accept $a_1$ with highest probabilities) based on the probability are stored in a stack, and the best L children of "r" are evaluated in the order of their acceptance probability. When there are less than L entries in "r", all of the children are stored in the stack. For example, the child of "r" that corresponds to the element of "r" for which the respective HMM yields the highest matching probability is evaluated first. The above procedure is repeated by matching the second letter of the input word, i.e., $a_2$ with the HMMs that correspond to the alphabet symbols that are stored in the evaluated child node.

At step 1210, if the current node is a leaf node, then the word $w_t$ (the word which corresponds the leaf node) is evaluated. At step 1212, if the number of characters in $w_t$ does not equal the number of characters in the input string, then the word which corresponds to the leaf node is not considered further.

HMM_budget is decremented each time an HMM is executed. At step 1212, if a leaf node is reached without having all the symbols in the input word processed, this implies that the input word has more symbols than the word stored at this leaf node, and hence this word is excluded from the list in best_matches.

Similarly, at step 1212, if all the symbols of the input word are processed and a leaf node is not reached, then this implies that the input word has fewer symbols than the words stored along this path of the Trie, and hence the path is excluded as well.

When a leaf node of the Trie is reached, and, at the same time, all the symbols of the input word are processed, the word stored at the leaf node is further tested to decide whether it is among the best k matches found so far.

At step 1214, this is achieved by comparing the word's matching probability to the matching probabilities of the words currently stored in best_matches. At step 1216, if the number of words in best_matches is less than k, then at step 1220, the word in the leaf node is added into the list of best_matches along with the matching probability for the leaf node.

Also, at step 1218, if best_matches is full (This happens when the number of words in best_matches is equal to k words), and the probability of the candidate word is greater than the probability of at least one of the words in best_matches, then the word in the leaf is added to best_matches, and the word in best_matches having the lowest probability of matching the input word is deleted at step 1220.

The matching probability of a word is computed as the product of all the probability values of the HMMs that lie in the path from the root of the Trie to the leaf node. As long as HMM budget still permits more searches to take place, alternative paths are evaluated by considering the second, third, and $L^{th}$ best HMM matches at each node in the Trie path and then traversing alternative routes in the Trie. In this case, the array HMM_tried is consulted before executing any HMMs because there is a chance that a particular HMM has been executed before against the same input symbol. In this regard, HMM_tried helps avoid the redundant execution of the HMMs. A more detailed listing of the method is given by the pseudo-code below.

1. Let the input word be $W_{in}=a_1, \ldots, a_n$, and maximum allowable budget be Max_budget.
2. Start at the root "r" of the Trie.
3. Store "r" into stack.
4. Initialize budget: budget ← Max_budget
5 Loop until budget is exhausted or no more nodes in stack to investigate:

while budget > 0 and stack not empty do
  (a) node t ← top element of stack
  (b) leaf-node-action: if t has no children (i.e., is a leaf node), then
     i. $W_t$ ← word associated with leaf node t
     ii. If input word still has more unmatched characters (i.e., n > depth(t), or length($w_t$)≠length($w_{in}$)) then discard Wt
     iii. Otherwise, compute $P(w_t)$, the entire probability of matching $w_t$. This is the product of all the probabilities of the HMM letter matchings in the path from "r" to "t".
     v. If number of words in best_matches < k or if $P(w_t)$ is higher than any of the words in best_matches, insert $w_t$ into best_matches. This may result in excluding the word in best_matches that has the lowest matching probability.
  (c) non-leaf-node-action—expand node t (t is a non-leaf node): if all symbols of $w_t$ are consumed, then skip t, else
     i. $a_i$ ← next symbol in win
     ii. avoid executing the same HMMs again for $a_i$ execute all HMMs that correspond to the alphabet symbols of children in t that are not in HMM_tried[i, 1 ... $N_A$]
     iii. decrease budget: budget ← budget—number of executed HMMs
     iv. store probabilities of accepting $a_i$ in array HMM_tried[i, 1 ... $N_A$]
     v. store the L-best HMMs in stack:
     vi. sort the probabilities with which the HMMs accept $a_i$ and store the best HMMs (i.e., the ones that accept $a_i$ with highest probabilities) in stack.

There is a problem with the above search method:

The search method is prefix-sensitive. In the process of matching, when using backtracking there is a tendency towards correcting mismatches that may have possibly occurred at the deeper levels of the Trie. On the other hand, correction of mismatches that may have possibly occurred at the earlier levels of the Trie (e.g., the root) is not performed until after exhausting the levels deeper in the Trie.

Figure 11:
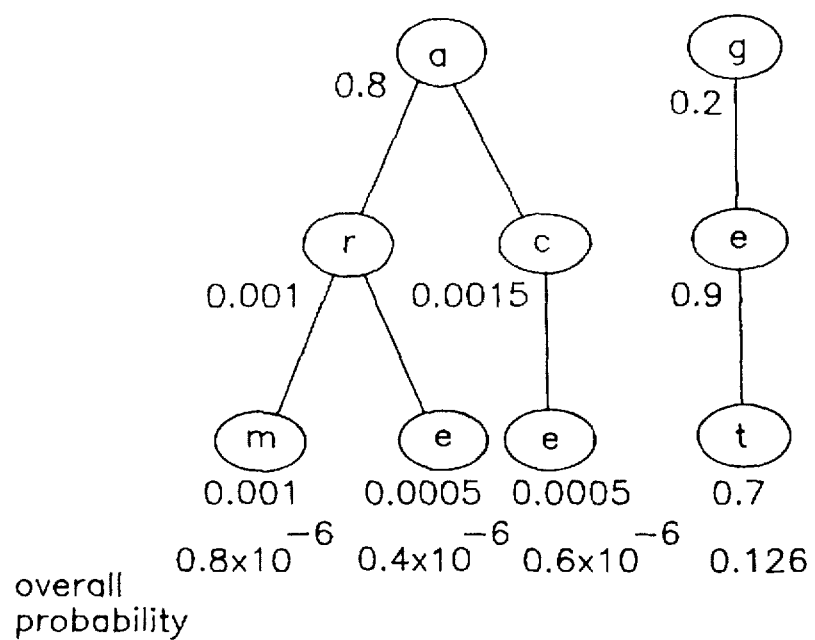
FIG. 11 shows an exemplary method for searching a database which is indexed using an HMM Trie data structure.

FIG. 11 shows an example of an HMM Trie. Assume that we are searching for the handwritten word "get". The nodes are labeled by the probability of accepting the corresponding letter of the input word using the HMM associated with the node. For example, let $N_A$ denotes the HMM associated with node i. Then, the probability of accepting the letter "e" of the word "get" by Hr (the HMM associated with node "r") is 0.001. The overall probability of accepting a word is computed as the product of all the accepting probabilities from the root to the leaf where the word is stored. For example, in FIG. 11, the overall probabilities of matching the input word with the sequence "a", "c", "e" in the Trie is: 0.8× 0.0015×0.0005=6.0×$10^7$ All the leaf nodes in FIG. 11 are labeled with the overall acceptance probabilities.

Assume that Ha of node a accepts the input alphabet symbol "g" with a higher probability value than that of $H_g$ of node g (e.g., if the "g" of "get" was not written carefully enough, so that the system matches it in favor of the letter "a"). According to the budget-based search method, node "a" is evaluated first before considering node "g" and the Trie paths are all searched in the following order: ace, arm, are, and get. Because the above search method is budget-based, the method may run out of budgeted time (or loop executions) before it reaches the correct word ("get"). On the other hand, the order implied by the overall probabilities of the words (listed at the bottom of FIG. 11) is as follows: get, arm, ace, and are.

The example of FIG. 11 demonstrates the sensitivity of the budget-based search method to the decisions performed by the method at the levels in the Trie that are closer to the root. It would be useful if the search method can estimate the overall probabilities before executing all of the HMMs, and then use this information to descend the Trie. In the following section, a new method is presented that enhances the performance of the budget-based method and reduces the prefix sensitivity problem.

DYNAMIC SEARCH ORDERING METHOD

Assume that an evaluation function $f(n)$ is provided, which is computed at every node "n" that is "evaluated" during the search. $f(n)$ is defined so that it provides an estimate of the overall probability of matching the input word with the words in the leaves of the subtree having node "n" as its root. Instead of evaluating the nodes in a last-in first-out manner (i.e., by using the stack, as in the budget-based method), a list termed OPEN is established that stores all the candidate nodes that have not yet been "evaluated" during the current search. The nodes in OPEN are sorted according to the values of $f(n)$. At each step of the method, the node with the highest value of $f(n)$ is selected from OPEN and is evaluated.

The outline of the method is as follows:
1. start at the root "r" of the Trie
2. store "r" into the list OPEN. 3. Loop until budget is exhausted or no more nodes in OPEN:
  (a) Node t—top element of OPEN (according to maximum value of the function $f$
  (b) If t has no children (i.e., is a leaf node), then perform leaf-node action;
  (c) expand node t (t is a non-leaf node)
     i. perform non-leaf-node-action and adjust budget
     ii. for each child u of t, compute $f(u)$ and store u and $f(u)$ in OPEN iii. reorder the nodes in OPEN in descending order based on their values of $f(u)$ The leaf and non-leaf node actions in the dynamic search ordering method are exactly the same as the corresponding actions of the search described above. The evaluation function $f(n)$ is now defined for each node "n" in the Trie. A path from the root to a leaf node defines a word in the database. For a given handwritten input word $w_{in}$, an optimal path is defined to be the path from the root node to the leaf that contains the word $w_m$ in the database, such that $w_m$ matches $w_{in}$ with the highest acceptance probability relative to all the other words in the database. It is assumed that the word in the database with the highest overall matching probability is the word being searched for. For each node "n," let $f^*$ (n) be the highest expected matching probability for all the words in the database with paths passing through node "n." For example, let the word w be a word in the database that lies in the subtree having node "n" as its root, with $w_n$ having the highest overall probability among all the other words in the subtree having "n" as a root node. In this case, $f^*(n)$ is the value of the overall probability that corresponds to the word $w_n$. This corresponds to a path passing from the root "r" to "n" and finally to the leaf node containing $w_n$.

More generally, $f^*$ (n) may be expressed as the product of two parts: the actual overall probability of the path from the root node "r" to node "a" (there is only one such path in the Trie and hence this path is by definition an optimal one) multiplied by the overall probability of the path from "a" to the leaf node of the word with the highest overall probability among all the words in the leaf nodes of the subtree having node "a" as a root.

Let $g^*$ (n) be the overall probability of the path from node "r" to node "a" (there is only one such path), and let $h^*$ (a) be the overall probability of the path from "a" to the leaf node of the word with the highest overall probability among all the words in the leaf nodes of the subtree having node "a" as its root. Therefore, $$f^*(n) = g^*(n) \times h^*(n).$$

The value of $f^*$ (a) is then the overall probability of an optimal path from "r" constrained to go through node "a." Notice also that $f^*$ (r) is the actual overall probability of an unconstrained optimal path from "r" to the word that has the highest overall matching probability in the entire database.

The evaluation function $f$ should be an estimate of $f^*$. The estimate may be given by:

$$f(n) = g^*(n) \times h(n),$$

where h is an estimate of $h^*$. Notice that it is not necessary to estimate $g^*$, because there is only one path from "r" to "a", and by the time node "a" is evaluated, all the nodes along the path from "r" to "a" have already been evaluated. Hence the exact value of the overall matching probability from "r" to "n" is known; this is also $g^*(n)$. For the estimate, h, of $h^*$, heuristic information is used, as described below.

The estimate h should be an upper bound of $h^*$ to ensure that the method finds the optimal path to the word with the highest overall matching probability (that is, the method must guarantee that $h(t) \geq h^*(t)$ for all nodes t. For example, choosing $h(t)=1$ is an absolute upper bound on $h^*(t)$ (because the probability is always less than one) and would result in a breadth-first search. The breadth-first method is guaranteed to find the optimal path because of its scanning nature. However, it is not desired because it is very slow. A tighter upper-bound is desired to speed-up the search.

Because matching in the Trie is performed on a symbol-by-symbol basis, the estimate of h is formed in a similar manner. Consider all the HMMs that correspond to the symbols of the alphabet set in the database. Let $p_i$ be the maximum probability with which the HMM Hi accepts instances of the alphabet symbol $a_i$, i.e., $$p_i = \max_{\forall u_i = \text{instance}(a_i)} H_{a_j}(u_i)$$

The instances of $a_j$ (the $u_i$'s) may be gathered during the training process of $H_{a_j}$ or, for the purpose of computing $p_i$, accummulatively whenever an instance of $a_i$ is made available at any time during the lifetime of the underlying database. Now, the maximum probability $P_{max}$ may be computed over all the alphabet symbols in the following way:

$$p_{max} = \max_{\forall i} p_i$$

To compute a proper estimate of h(t) for a node t, h(t) has to form an upper bound of $h^*(t)$. This is achieved in the following way.

Let L be the length of the input word, and let depth(t) be the depth of a node t, where the root of the Trie is at depth 0, i.e., depth(t) is the length of the path from the root of the Trie to node t. Also, let $W_{in}=a_1, a_2, \ldots, a_{dt}$ be the input handwritten word. Then, at depth dt of the Trie, the part of the input word that is processed so far is a prefix of w of length dt, and may be expressed as: $w_t=a_1, a_2, \ldots, a_{dt}$. The maximum possible h(t) would be attained if all of the remaining symbols of $w_{in}$ (i.e., $a_{d+1}, \ldots, a_L$) are matched by HMMs that result in the highest possible probabilities, i.e., each of the remaining symbols matches with probability $P_{max}$. Therefore, h(t) can be estimated as:

$$h(t) = p_{max}^{L-dt}$$

h(t) forms an educated upper-bound on $h^*(t)$ and hence guarantees that the search method will eventually find the best match without having to perform a breadth-first search.

As an example of the execution of this method, consider the Trie of FIG. 11 when searching for a handprinted instance of the word "get". Table 1 gives the contents of OPEN during the execution of the new method.

TABLE 1

| # of Iterations | Inserted Node(s) | Estimated Probability Values for Nodes in Open | Evaluated Node |
|---|---|---|---|
| 1 | a,g | $f(a) = 0.8 \times 0.9 \times 0.9 = 0.648$ | a |
|   |   | $f(g) = 0.2 \times 0.9 \times 0.9 = 0.162$ |   |
| 2 | c,r | $f(g) = 0.2 \times 0.9 \times 0.9 = 0.162$ | g |
|   |   | $f(c) = 0.8 \times 0.0015 \times 0.9 = 0.00108$ |   |
|   |   | $f(r) = 0.8 \times 0.001 \times 0.9 = 0.00072$ |   |
| 3 | e | $f(e) = 0.2 \times 0.9 \times 0.9 = 0.162$ | e |
|   |   | $f(c) = 0.8 \times 0.0015 \times 0.9 = 0.00108$ |   |
|   |   | $f(r) = 0.8 \times 0.001 \times 0.9 = 0.00072$ |   |
| 4 | t | $f(t) = 0.2 \times 0.9 \times 0.7 = 0.126$ | t |
|   |   | $f(c) = 0.8 \times 0.0015 \times 0.9 = 0.00108$ |   |
|   |   | $f(r) = 0.8 \times 0.001 \times 0.9 = 0.00072$ |   |

Assume that $P_{max}=0.9$. In the first iteration of the method, nodes "a" and "g" are inserted into OPEN, where $f(a)=0.8\times 0.9\times 0.9=0.648$ and $f(g)=0.2\times 0.9\times 0.9=0.162$. Because "a" has the maximum value of $f$, the search method elects to evaluate node "a" and removes "a" from OPEN. Now, the children of "a" are inserted into OPEN, where $f(r)=0.8\times 0.001\times 0.9=0.00072$ and $f(c)=0.8\times 0.0015\times 0.9=0.00108$.

Because "g" has the maximum value of $f$ among all the other nodes in OPEN, the method evaluates "g" next and removes "g" from OPEN. Node "e," the child of "g," is inserted into OPEN with $f(e)=0.2\times0.9\times0.9=0.162$. Because "e" has the maximum value off among all the other nodes currently in OPEN, "e" is evaluated next and is deleted from OPEN. Now "t" is the only child of "e" in the Trie, and hence "t" is inserted into OPEN with $f(t)=0.2\times0.9\times0.7= 0.126$. Therefore, "t" is evaluated next, because "t" has the maximum value of $f$ among all the other nodes in OPEN. This results in matching the word "get", which is added into the list best_matches. Notice that the word "get" is found first using the search method according to the invention, whereas it is found last using the budget based search method of FIG. 12.

The proper selection of the evaluation function $f$ ensures that the search method according to the invention always finds the item in the handwritten database that is globally optimal (i.e., the item that best matches the input pattern).

Figure 13:
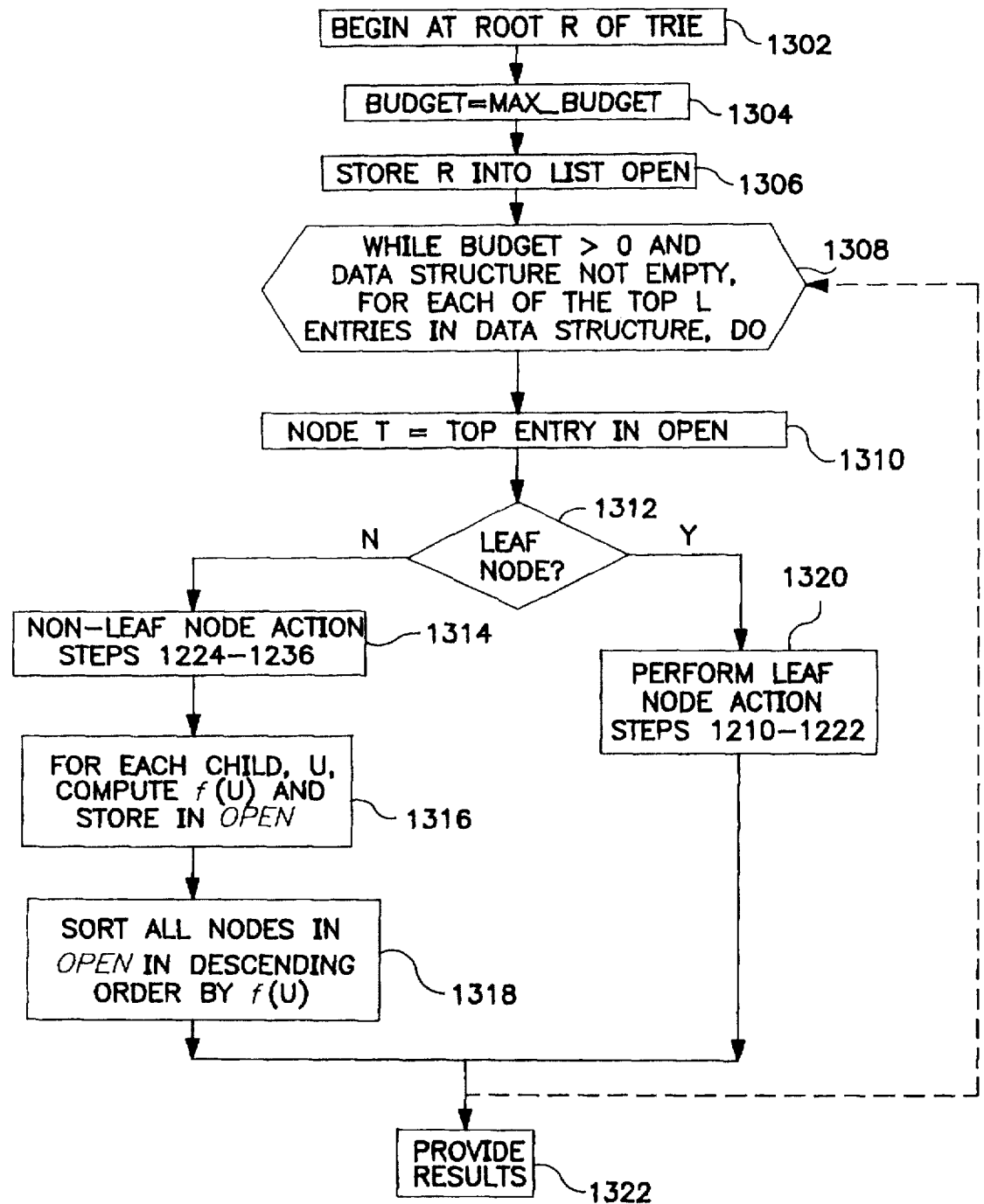
FIG. 13 is a flow chart diagram showing the dynamically ordered search method for matching an object in the HMM Trie structure.

FIG. 13 is a flow chart diagram showing the difference between the dynamically ordered search method and the budget-based search method of FIG. 12. At step 1302, the search begins at the root of the Trie structure. At step 1304, the value of the variable budget is initialized to max_budget. At step 1306, entries are added to the list OPEN for each respective element of the root node.

At step 1308, the main loop of steps 1310 to 1320 is executed so long as the value of the variable budget is greater than zero, and there are entries remaining in the data structure OPEN.

At step 1310, the top entry in OPEN (the entry having the greatest overall probability estimate) is selected as node t. At step 1312, a determination is made as to whether this node is a leaf node.

At step 1314, if the current node is not a leaf, a non-leaf-node-action is performed. This non-leaf-node-action is essentially similar to steps 1224–1236 of FIG. 12. A check is made to make sure that the input string is not too short for any words that pass through the current node. The node "t" is evaluated by retrieving the HMM probabilities from HMM_tried for each element, or computing the HMM acceptance value for each HMM that is not in HMM_tried. The budget is decreased for each HMM that is executed.

At step 1316, for every child, "u" of node "t," the value of $f(u)$ is computed, as defined above, and an entry is stored in OPEN for each child.

At step 1318, all of the nodes in OPEN are sorted in descending order by the value of $f(u)$. This step in particular differs from the method of FIG. 12. Instead of adding L of the elements of node "t" to the top of a stack data structure (as in FIG. 12), the elements of node "t" are commingled with other nodes that have not yet been evaluated (i.e., other nodes for which the HMMs have not all been executed), and sorted. If the current node is a non-leaf node, the main loop is repeated. When a leaf node is reached, step 1320 is executed.

At step 1320, if the current node is a leaf node, then a leaf-node-action is performed. This is similar to the leaf-node action of steps 1210–1222. If the number of characters in the current leaf node differs from the number of characters in the input sequence, the word corresponding to the leaf node is discarded (not considered further). If the sizes of the input sequence and the candidate word are the same, the overall probability for the candidate word in the leaf is computed as the product of all of the HMM acceptance values between the root and the leaf. If the number of words in best_matches is less than the predetermined value k, or if the probability for the candidate word exceeds the probability for a word already stored in best_matches, then the candidate word is stored in best_matches.

At step 1322, the nodes listed in best_matches are provides as the result of the search.

The following pseudo-code further explains the example of FIG. 13.

1. start at the root "r" of the Trie
2. store "r" into a list termed OPEN, highest probabilities) in a stack, termed OPEN.
3. Loop until budget is exhausted or no more nodes in OPEN:

(a) node t ← top element of OPEN
  (b) if t has no children (i.e., is a leaf node), then
    i. $w_t$ ← word associated with leaf node t
    ii. if input word still has more unmatched characters (i.e., n > depth(t) or even length($w_t$)≠length($w_{in}$)) then discard $w_t$
    iii. otherwise, compute $P(w_t)$, the entire probability of matching $w_t$. This is the product of all the probabilities of the HMM letter matchings in the path from "r" to t.
    iv. if number of words in best_matches < k or if $P(w_t)$ is higher than any of the words in best_matches, insert $w_t$ into best_matches. This may result in excluding the word(s) in best_matches that have the lowest matching probability.
  (c) expand node t (if t is a non-leaf node): if all symbols of $W_{in}$ are consumed, then skip t, else
    i. $a_i$ ← next symbol in $w_{in}$
    ii. avoid executing the same HMMs again for $a_i$: execute all HMMs that correspond to the alphabet symbols of children in t that are not in HMM_tried (i, 1 ... $N_A$)
    iii. decrease budget: budget ← budget—number of executed HMMs
    iv store probabilities of accepting $a_i$ in array HMM-tried(i, 1 ... $N_A$)
    v. for each child u of t, compute $f(u)$ and store u and $f(u)$ in OPEN
    vi. reorder the nodes in OPEN in descending order based on their values of $f(u)$

HANDLING FRAMING ERRORS

According to a further aspect of the invention, the dynamic search ordering method can handle the following types of errors: insertion, deletion, and m-n substitution errors (defined below). For ease of understanding for the reader, correction of these error types is explained using an example based on the English alphabet set. However, the search algorithm handles them in the context of a stroke-based alphabet set. One of ordinary skill in the art would readily understand that the invention as practiced accommodates insertion, deletion and substitution of strokes. The types of errors are defined as follows:

1) insert: an insertion error occurs when extra strokes or letters are added as the user writes the query word. An example of an insertion error occurs when the user writes the word "airmail" as "airnmail". In this case, the letter n is inserted mistakenly by the user in the middle of the word.

2) deletion: a deletion error occurs when some strokes or letters in the original handwritten word are omitted as the user writes the query word. An example of a deletion error is when the user writes the word "airmail" as "aimail, i.e., missing the letter r.

3) m-n substitution: an m-n substitution error occurs when m strokes or letters in the original handwritten word are substituted by n other strokes when writing the query word. An example of a 1-2 substitution error is when the word "airmail" is seen by the system as the word "airrnail". In this case, the letter "m" of the original word is substituted by the letters "r" and "n" in the query word.

These types of errors may also be the result of errors in the segmentation process that take place prior to matching the handwritten characters. When the unit of segmentation is at the stroke level and is not at the letter level, then these errors are much more likely to occur. As the unit of segmentation decreases in granularity, the variations in handwriting a word are translated to insertion, deletion, or substitution errors.

The notation p(a|b) is used to denote the probability of the matching item being "a," given that the current item in the query word looks like the item "b." Again, the English alphabet set is used instead of stroke symbols for ease of illustration only. In practice, however, the input word is segmented into simple strokes as described in the previous sections, and not as English letters.

The elements of the list OPEN are in the form of 5-tuples <error-type, node, word-location, probability, g(node), h(node)>, wherein:

error-type can have one of the following assignments:
1. m—an error-free match (or a 1—1 substitution error).
2. d—a deletion error
3. i—an insertion error.
4. $s_{mn}$—an m-n substitution error, and node is the node of the Trie to be evaluated when the 5-tuple is to be processed by the method word-location is the location in the input word where the search will resume when the node corresponding to the 5-tuple is to be evaluated.

g(node) is the probability of matching the prefix of the handwritten input word that has already been processed with the nodes of the Trie that correspond to the path from the root of the Trie to the current node.

h(node) is the estimated probability of matching the remaining portion of the handwritten input word with the nodes of the Trie that are descendants in the subtree having its root at the current node.

The overall evaluation function $f(node)$ is computed as the product of g(node) and h(node). The 5-tuples in OPEN are sorted according to the values of $f(n)$. At each step of the method, the tuple with the highest possible $f(n)$ is selected from OPEN and is evaluated by the method. Let the input handwritten word be represented by the strokes $a_1, a_2, \ldots, a_L$, where L is the number of strokes in the input handwritten word. Assume that the method is at node "n," and that the query handwritten word is matched up to stroke $a_i$ (i.e., that the remaining portion of the handwritten word that still needs to be matched is: $a_{i+1}, \ldots, a_L$) and the evaluation functions g=g(n) and h=h(n). That is, the method is processing the tuple <*, n, $a_i \ldots a_L$, g=g(n), h=h(n)>.

The method handles framing errors in the following way. Instead of having a single entry in the list OPEN for a node that has not been evaluated yet, five different entries are added. These five entries correspond to the following five conditions: no framing errors or 1-1 substitution, insertion error, deletion error, 1-2 substitution error, and 2-1 substitution error. Notice that, in the discussion below, only handling of 1-2 and 2-1 substitution errors is shown. The more general m-n form can be treated similarly (The case of m > n is treated in the same way as the 2-1 case, while the case of m < n is treated in the same way as the 1-2 case). The five entries are formed as follows:

1. no framing errors: this case covers both the error-free matching as well as the 1-1 substitution error. For each stroke "s" in node "n," the method computes the probability: $p(a_i|s)$ and inserts the following tuple into the set OPEN:

$$<m, child(n,s), a_i+1 \ldots a_L, g=g(n)*p(a_i|s), h=P_{max}^{L-i}>,$$

where child(n,s) is the child node of n that corresponds to stroke a; g is the probability of the optimal path from the root to node n; and h is an estimate of the probability of matching the rest of the input handwritten word with the nodes of the Trie. This formula for estimating h is explained at the end of this section.

2. insertion error: in this case, it is assumed that the current stroke in the input handwritten word (stroke $a_i$) is added mistakenly into the pattern and has to be ignored by the matching method. The search should resume from the next stroke of the input handwritten word.

Assume that insertion errors can occur with probability $p_i$. As a result, the method inserts the following tuples into OPEN: for each stroke "s" in node "n," the method computes the probability: $p(a_{i+1}|s)$ and inserts the following tuple into the set OPEN:

$$<i, child(n, s), a_{i+2} \ldots a_L, g=g(n) * p_i * p(a_{i+1}|s), h=P_{max}^{L-i-1}>.$$

3. deletion error—In this case, it is assumed that there is a missing stroke just prior to the position of current stroke in the input handwritten word. This is treated by skipping the current node (node "n"), and matching the current stroke with all the strokes that appear in the child nodes of node "n."

Assume that deletion errors occur with probability $P_d$. As a result, the method inserts the following tuples into OPEN: for each child node "u" of "n," and for each stroke "s" in node "u," the method computes the probability: $p(a_{i+1}|s)$ and inserts the following tuple into the set OPEN:

$$<d, child (u,s), a_{i+1} \ldots a_L, g=g(n) * P_d * p(a_i|s), h=P_{max}^{L-i}>.$$

4. 1-2 substitution error: In this case, it is assumed that the current and next strokes of the query handwritten word correspond to just one stroke in the originally stored matching word in the handwritten database, and that the stroke is split into two strokes while writing and segmenting the handwritten query word. This error type is treated by matching both the current and next stroke of the handwritten query word with each of the strokes in the current node.

Assume that 1-2 substitution errors occur with probability $P_{12}$. As a result, the method inserts the following tuples into OPEN: for each stroke "s" in node "n," the method computes the probability: $p(a_i a_{i+1}|s)$ and inserts the following tuple into the set OPEN:

$$<s_{12}, child(n,s), a_{i+2} \ldots a_L, g=g(n) * P_{12} * p(a_i a_{i+1}|s), h=P_{max}^{L-i-1}>.$$

5. 2-1 substitution error: In this case, it is assumed that the current stroke of the query handwritten word corresponds to two strokes of the matching word originally stored in the handwritten database; that these two strokes were merged into one stroke during the segmentation process, or due to the handwriting style of the user at the time of writing the query word. This error type is treated by matching all the pairs of strokes in the current node and its children nodes with the current stroke of the handwritten query word.

Assume that 2-1 substitution errors occur with probability $P_{21}$. As a result, the method inserts the following tuples into OPEN: for each stroke s in node n, and for each stroke "$s_u$" that is in a child node "u" of "n," the method computes the probability: $p(a_i|ss_u)$ and inserts the following tuple into the set OPEN:

$$<S_{21}, child(u,s), a_{i+1} \ldots a_L, g=g(n) * p_{21} * p(a_i|ss_u), h=p_{max}{}^{L-i}>.$$

The values of $p_i$, $p_d$, $p_{12}$, and $p_{21}$ reflect the probabilities that the user performs an insertion error, a deletion error, a 1-2 or a 2-1 substitution error, respectively, when he/she writes a cursive word. These probability values may also be viewed as parameters that can be tuned to direct the search. The exact values of these probabilities are writer-dependent and hence are difficult to compute.

These values may be estimated by, for example, using results from linguistic studies that empirically measure the frequencies of occurrence of these types of errors by different classes of users. Using these values as initial guesses for the system's user, the system is incrementally trained by changing the values of these parameters each time a match is performed by the system. As alternative way is to let the user perform a separate training session where he/she can write a group of words and then count the number of errors that occur in this session, and use them as estimates for the desired probability values.

The above described method is termed DT-search. DT-search can overcome the prefix sensitivities of the budget based search method of FIG. 12, and can handle framing errors.

The outline of the method is given below. Notice how the method treats framing errors and how the method estimates and then uses the evaluation function $f(n)$ to order and evaluate the candidate nodes in OPEN.

Figure 14:
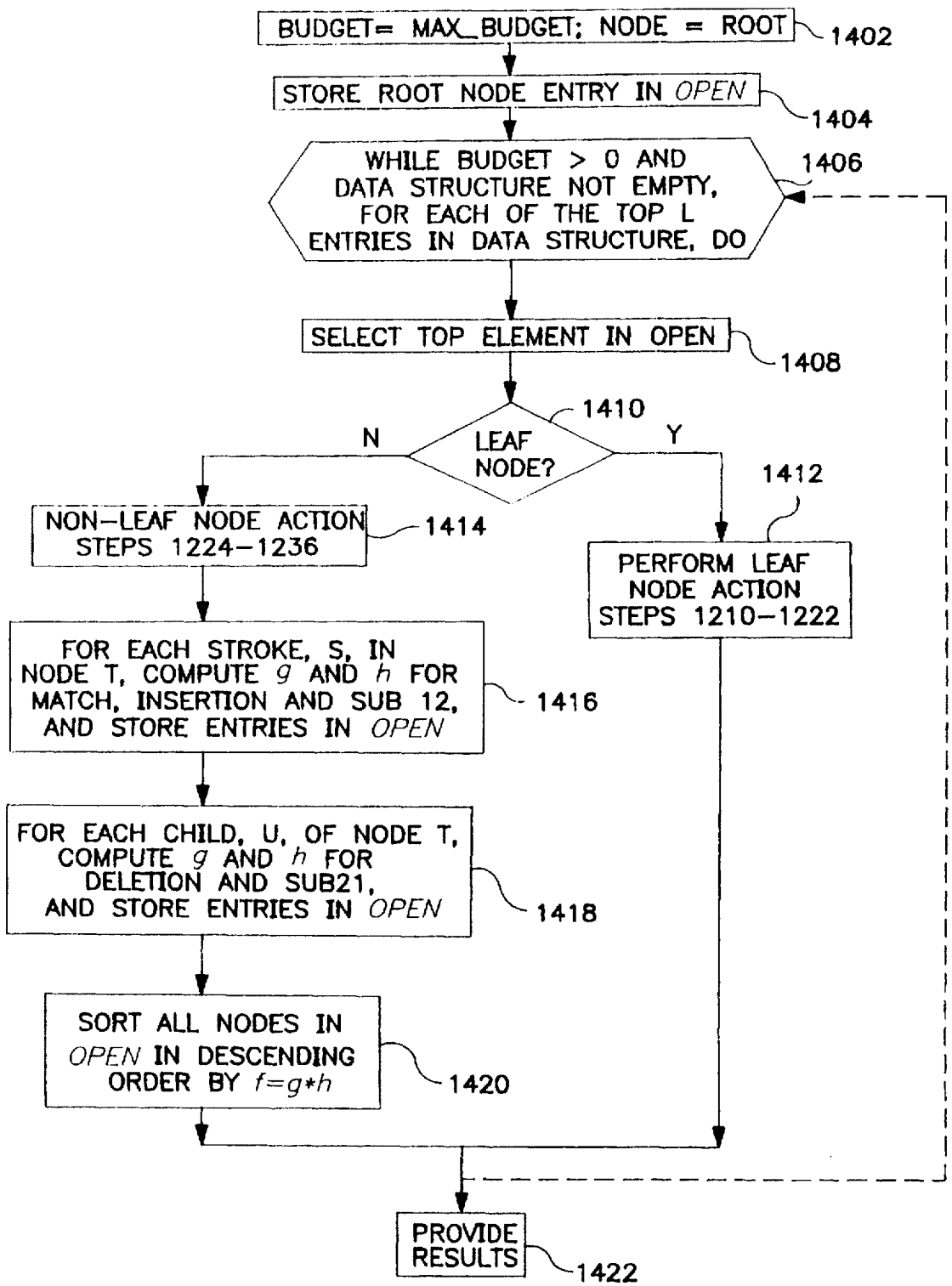
FIG. 14 is a flow chart diagram showing how the dynamically ordered search method may be applied to match an object in the presence of framing errors.

FIG. 14 is a flow chart diagram showing the exemplary DT search method. At step 1402, the search begins at the root of the Trie structure. The value of the variable "budget" is initialized to "max_budget." At step 1404, entries are added to the list OPEN for each respective element of the root node.

At step 1406, the main loop of steps 1408 to 1420 is executed so long as the value of the variable "budget" is greater than zero, and there are entries remaining in the data structure OPEN.

At step 1408, the top entry in OPEN (the entry having the greatest overall probability estimate) is selected as node t. At step 1410, a determination is made as to whether this node is a leaf node.

At step 1414, if the current node is not a leaf, a non-leaf-node-action is performed. This non-leaf-node-action is essentially similar to steps 1224–1236 of FIG. 12. A check is made to make sure that the input string is not too short for any words that pass through the current node. The node "t" is evaluated by retrieving the HMM probabilities from HMM_tried for each element, or computing the HMM acceptance value for each HMM that is not in HMM_tried. The budget is decreased for each HMM that is executed.

At steps 1416 and 1418, a plurality of entries are created. Unlike the example of FIG. 13 (in which a respective single entry is created for each element in the current node "t"), in steps 1416 and 1418, multiple entries are created for each element, corresponding to matching, insertion, deletion, 1-2 substitution and 2-1 substitution. At step 1420, all of the entries in OPEN are sorted.

The main loop is repeated until a leaf node is reached. At step 1412, when the leaf node is reached, the nonleaf-node action is performed, which is similar to steps 1210–1222 of FIG. 12. The candidate word in the leaf may be added to best_matches. The main loop is then repeated for the next entry in OPEN. When there are no more entries, or when budget is decremented to zero, the contents of best_matches are provided as the result of the search at step 1422.

The following pseudocode describes the process:
1. start at the root "r" of the Trie
2. store $<m, r, a_1 a_2 \ldots a_L, g=1, h=p_{max}{}^L>$ into the list OPEN
3. loop until budget is exhausted or no more nodes in OPEN:
   (a) tuple t ← top element of OPEN
   (b) $n_t$ ← node (t)
   (c) $g_t$=g(t), $h_t$=h(t)
   (d) if $n_t$ has no children (i.e., it is a leaf node), then perform leaf-node-action; then
      i. $S_t$ ← word associated with leaf node $n_t$
      ii. if input handwritten word still has more unmatched characters (i.e., L > depth(nt) or length ($s_t$) ≠ length ($s_{in}$) then discard $s_t$
      iii. otherwise, compute $p(s_t)$, the entire probability of matching $s_t$. This is the product of all the probabilities of the HMM stroke matchings in the pat h from r to $n_t$.
      iv. If number of words in best_matches < k, or if $P(s_t)$ is higher than any one of the words in best_matches, insert $s_t$ into best_matches. This may result in excluding the word in best matches that have the lowest matching probability.
   (e) expand node $n_t$ (if $n_t$ is a non-leaf node): if all symbols of Sin are consumed, then skip $n_t$, else
      i. $a_i$ ← next stroke in $s_{in}$
      ii. avoid executing the same HMMs again for $a_i$: execute all HMMs that correspond to the alphabet strokes of children in n, that are not in HMM_tried [i, 1 . . . $N_A$]
      iii. decrease budget: budget ← budget—number of executed HMMs
      iv. store probabilities of accepting $a_i$ in array HMM_tried[i, 1 . . . $N_A$]
      v. for all strokes s in $n_t$ insert the following tuples into OPEN $<m, child(n,s), a_{i+1} \ldots a_L, g=g_t * p(a_i|s), h=p_{max}{}^{L-i}>,$ $<i, child(n,s), a_{i+2} \ldots a_L, g=g_t * p_i * p(a_{i+1}|s), h=p_{max}{}^{L-i-1}>.$ $<s_{12}, child(n,s), a_{i+2} \ldots a_L, g=g_t * p_{12} * p(a_i a_{i+1}|s), h=p_{max}{}^{L-i-1}>.$ vi. for each child u of $n_t$ insert the following tuples into OPEN:

$<d, child(u,s), a_{i+1} \ldots a_L, g=g_t * p_d * p(a_i|s), h=p_{max}{}^{L-i}>.$ $<s_{21}, child(u,s), a_{i+1} \ldots a_L, g=g_t * p_{21} * p(a_i|ss_u), h=p_{max}{}^{L-i}>.$ vii. reorder the nodes in OPEN in descending order based on their values of $f=g*h$.

Although the invention has been described herein with reference to one exemplary Trie data structure, the invention may also be applied to any other HMM-based methods for matching data in a Trie data structure set forth in U.S. patent application Ser. No. 08/300,795, filed Sep. 2, 1994, which is incororated herein by reference for its teachings on handwriting matching using HMMs in a Trie data structure.

Other techniques for pattern matching may be used instead of using HMMs. For example, using neural networks, or any form of distance function that provides ranking among the entries in a different node of the Trie.

Although the invention has been described in terms of exemplary embodiments, it is not limited thereto. Rather, the appended claims should be construed to include other variants and embodiments of the invention which may be made by those skilled in the art without departing from the true spirit and scope of the present invention.

What is claimed:

1. A method of searching for one of a plurality of objects that matches an input sequence of handwritten objects, the objects being modeled by concatenating members of a set of component objects, the method comprising the steps of:

(a) generating a Trie structure representing the plurality of objects, the Trie structure having a plurality of non-leaf nodes, wherein each non-leaf node includes at least one element, each element having a child node associated therewith, including the steps of:

assigning component objects of each of the plurality of objects to the respective elements of respective nodes of the Trie structure; and associating a respective hidden Markov model (HMM) with each element of each non-leaf node, the HMM representing the respective component object of the element;

(b) estimating a maximum probability of any of the HMMs accepting any of the set of component objects;

(c) selecting a root node of the Trie structure;

(d) selecting a plurality of the elements of the selected node;

(e) applying a plurality of segments of the input sequence to respective HMMs associated with the selected elements to generate respective acceptance values;

(f) calculating, for each one of the selected elements, a respective estimated probability that the input sequence matches any of the plurality of objects represented by respective paths in the Trie structure that pass through the child node associated with the one selected element, as a function of the estimated maximum probability and the respective acceptance value of the one element; and (g) searching next for said one of the plurality of objects that matches the input sequence within a subtree which has as a root the child node associated with the one of the selected elements for which the respective estimated probability is greatest.

2. A method according to claim 1, wherein step (g) includes the steps of:

(1) selecting each element of the child node associated with the one of the selected elements for which the respective estimated probability is greatest, and (2) executing steps (d) through (g), recursively for each selected node.

3. A method according to claim 1, further comprising the step of:

establishing a data structure which includes a plurality of entries, each entry being associated with a respectively different element of at least one of the nodes in the Trie structure, wherein step (d) includes the step of selecting the plurality of elements from among the elements with which the entries in the data structure are associated.

4. A method according to claim 3, wherein the data structure only includes entries associated with elements for which the respective HMMs associated therewith have not yet been executed during the search.

5. A method according to claim 3, wherein step (g) includes the steps of:

(1) selecting each element of said child node associated with the one of the selected elements for which the respective estimated probability determined in step (f) is greatest, (2) adding a set of entries to the data structure, each added entry being associated with a respectively different element of said child node, (3) executing the respective HMM associated with each element of said child node, to generate a respective acceptance value for each element of the child node, (4) deleting from the data structure the entry which is associated with the element with which said child node is associated, (5) executing steps (d) through (g), recursively.

6. A method according to claim 5, further comprising the step of discontinuing executing steps (d) through (g) when a predetermined number of HMMs have been executed during the search.

7. A method according to claim 1, wherein the Trie structure has N levels, ordinally numbered 0 through N-1, and step (f) includes, for each selected element:

calculating the estimated probability associated with the selected element, according to the equation:

$$P = \left( \prod_{i=0}^{L} A_i \right) * M^{N-i-L}$$

wherein P is the estimated probability, i is an index, L is the level of the node having the selected element, $A_i$ is the acceptance value associated with the element in level $i$ within the respective path through the node having the selected element, and M is the estimated maximum probability of any of the HMMs accepting any of the set of component objects.

8. A method according to claim 1, further comprising:

establishing a data structure which includes a plurality of entries associated with each respective one of a subset of the plurality of elements of at least one of the nodes in the Trie structure, each entry identifying:

(1) a respective type of error condition that could result in the input sequence occurring, and (2) information identifying an estimated probability that the input sequence matches any of the plurality of objects represented by respective paths in the Trie structure that pass through the child associated with the element with which the entry is associated, if the identified type of error condition is present, wherein step (d) includes selecting the plurality of elements from among the elements with which the entries in the data structure are associated.

9. A method according to claim 8, wherein the types of error conditions include error free matches, insertion errors, deletion errors and substitution errors.

10. A method of searching for one of a plurality of objects that matches an input sequence of handwritten objects, the objects being modeled by concatenating members of a set of component objects, the method comprising the steps of:

(a) generating a Trie structure representing the plurality of objects, the Trie structure having a plurality of non-leaf nodes, wherein each non-leaf node includes at least one element, each element having a child node associated therewith, including the steps of:

assigning component objects of each of the plurality of objects to the respective elements of respective nodes of the Trie structure; and associating a respective hidden Markov model (HMM) with each element of each non-leaf node, the HMM representing the respective component object of the element;

(b) estimating a maximum probability of any of the HMMs accepting any of the set of component objects;

(c) selecting a root node of a subtree in the Trie structure that is to be searched;

(d) selecting a plurality of the elements of the selected node;

(e) applying a plurality of segments of the input sequence to respective HMMs associated with the selected elements to generate respective acceptance values;

(f) calculating, for each one of the selected elements, a respective estimated probability that the input sequence matches any of the plurality of objects represented by respective paths in the Trie structure that pass through the child node associated with the one selected element, as a function of the estimated maximum probability and the respective acceptance value of the one element; and (g) searching next for said one of the plurality of objects that matches the input sequence within a subtree which has as a root the child node associated with the one of the selected elements for which the respective estimated probability is greatest.

11. A method of searching for one of a plurality of objects that matches an input sequence of handwritten objects, the objects being modeled by concatenating members of a set of component objects, the method comprising the steps of:

(a) generating a Trie structure representing the plurality of objects, the Trie structure having a plurality of nodes, wherein each node includes at least one element, each element being associated with a respective child node, including the steps of:

assigning component objects of each of the plurality of objects to respective elements of respective nodes of the Trie structure; and associating a respective hidden Markov model (HMM) with each element of each node, the HMM representing the respective component object of the element;

(b) establishing a data structure which includes a plurality of entries, each entry identifying a respectively different child of a root node of the Trie structure;

(c) estimating a maximum probability of any of the HMMs accepting any of the set of component objects;

(d) selecting a node which is the root node of the Trie structure;

(e) selecting each element of the selected node;

(f) applying respective segments of the input sequence to the respective HMMs associated with each selected element to generate respective acceptance values;

(g) estimating, for each selected element, a respective value of the estimated probability that the input sequence matches any of the plurality of objects represented by respective paths in the Trie structure that pass through the respective child associated with that element, as a function of the estimated maximum probability and the respective acceptance value of the selected element;

(h) selecting the node having the element for which the respective value of the estimated probability is greatest;

(i) adding a set of entries to the data structure, each added entry in the set identifying a respectively different child of the selected node;

(j) deleting the entry which identifies the selected node;

(k) repeating steps (e) through (j).

12. A method of searching for one of a plurality of objects that matches an input sequence of handwritten objects, the objects being modeled by concatenating members of a set of component objects, the method comprising the steps of:

(a) generating a Trie structure representing the plurality of objects, the Trie structure having a plurality of nodes, wherein each node includes at least one element, including the steps of:

assigning component objects of each of the plurality of objects to respective elements of respective nodes of the Trie structure; and associating a respective hidden Markov model (HMM) with each element of each node, the HMM representing the respective component object of the element;

(b) establishing a data structure which includes a plurality of entries, each entry identifying a respectively different child of at least one of the nodes in the Trie structure;

(c) estimating a maximum probability of any of the HMMs accepting any of the set of component objects;

(d) selecting a first node of the Trie structure identified in one of the plurality of entries;

(e) selecting a second node of the Trie structure identified in a further one of the plurality of entries, such that the first node does not lie between a root of the Trie structure and the second node, and the second node does not lie between the root of the Trie structure and the first node;

(f) applying first and second segments of the input sequence to respective HMMs associated with elements of the first and second nodes to generate respective first and second acceptance values;

(g) determining, for each respective child of each of the first and second nodes, a respective value of the estimated probability that the input sequence matches any of the plurality of objects represented by respective paths in the Trie structure that pass through the respective child, based on the respective first and second acceptance values and the estimated maximum probability;

(h) selecting the child for which the respective value of the estimated probability is greatest as the first node;

(i) adding a set of entries to the data structure, each added entry in the set identifying a respectively different child of the selected child;

(j) deleting the entry which identifies the selected child;

(k) repeating steps (e) through (j).

13. Apparatus for searching for one of a plurality of objects that matches an input sequence of handwritten objects, the objects being modeled by concatenating members of a set of component objects, comprising:

memory means including a Trie structure representing the plurality of objects, the Trie structure having a plurality of nodes, wherein each node includes at least one element, each element being associated with a respective child node, a plurality of component objects of each of the plurality of objects being assigned to respective elements of respective nodes of the Trie structure, and a respective hidden Markov model (HMM) being associated with each element of each node, the HMM representing the respective component object of the element;

said memory means including a data structure which has a plurality of entries, each entry identifying a respectively different child of a root node of the Trie structure;

means for estimating a maximum probability of any of the HMMs accepting any of the set of component objects;

root selecting means for selecting a node which is the root node of the Trie structure;

means for selecting each element of the selected node;

means for applying respective segments of the input sequence to the respective HMMs associated with each selected element to generate respective acceptance values;

means for estimating, for each selected element, a respective value of the estimated probability that the input sequence matches any of the plurality of objects represented by respective paths in the Trie structure that pass through the respective child associated with that element, as a function of the estimated maximum probability and the respective acceptance value of the selected element;

means for selecting the node having the element for which the respective value of the estimated probability is greatest;

means for adding a set of entries to the data structure, each added entry in the set identifying a respectively different child of the selected node; and means for deleting the entry which identifies the selected node, wherein the element selecting means, the input sequence applying means, the estimating means, and the node selecting means operate on the node selected by the selecting means.

* * * * *